United States Patent [19]
Harumatsu

[11] Patent Number: 6,137,645
[45] Date of Patent: Oct. 24, 2000

[54] METHOD AND APPARATUS FOR ENCODING AND DECODING DIGITAL DATA BLOCKS WITH IMPROVED ERROR CORRECTION

[75] Inventor: Mitsuo Harumatsu, Yokohama, Japan

[73] Assignee: Victor Company of Japan, Ltd., Yokohoma, Japan

[21] Appl. No.: 09/019,725

[22] Filed: Feb. 6, 1998

[30] Foreign Application Priority Data

Sep. 30, 1997 [JP] Japan .................................. 9-282538

[51] Int. Cl.⁷ ..................................................... G11B 5/09

[52] U.S. Cl. ............................................... 360/49; 360/53

[58] Field of Search ................... 360/53, 49, 48, 360/51; 714/701

[56] References Cited

U.S. PATENT DOCUMENTS 5,237,574  8/1993  Weng ..................................... 360/49 X
5,717,535  2/1998  French et al. ............................ 360/53

*Primary Examiner*—Alan T. Faber
*Attorney, Agent, or Firm*—Pollock, Vande Sande & Amernick

[57] ABSTRACT

First data blocks are reproduced from a recording medium. The first data blocks contain respective identification information pieces for discriminating the first data blocks from each other. A decision is made as to whether or not each of the reproduced first data blocks is correct in response to the identification information piece therein. Each reproduced first data block which is decided to be not correct is discarded. Second data blocks are generated from the reproduced first data blocks which are not discarded. The second data blocks differ in size from the first data blocks.

28 Claims, 11 Drawing Sheets

DATA BLOCK "A"

DATA BLOCKS "B"

DATA BLOCKS "A"

DATA BLOCKS "B"

| DATA BLOCK "B" | 0A | 1B | 0C | 1D | 1X | 0E | 1F | 0G | 1H |
|---|---|---|---|---|---|---|---|---|---|
| PREDICTED VALUE | | 0 | 1 | 0 | 1 | 0 | 0 | 1 | 0 | 1 |
| DETECTED VALUE | | 0 | 1 | 0 | 1 | 1 | 0 | 1 | 0 | 1 |
| DECISION RESULT | | 0 | 0 | 0 | 0 | 1 | 0 | 0 | 0 | 0 |
| OUTPUT PACKET | | | AB | | CD | | | EF | | GH |

⟶ TIME

METHOD AND APPARATUS FOR ENCODING AND DECODING DIGITAL DATA BLOCKS WITH IMPROVED ERROR CORRECTION

BACKGROUND OF THE INVENTION

1. Field of the Invention

This invention relates to an apparatus for reproducing digital data. This invention also relates to a method of reproducing digital data.

2. Description of the Related Art

It is known that parity information for error correction is added to digital data before the digital data is recorded on a recording medium. During the reproduction of the digital data from the recording medium, the parity information is used in correcting an error or errors in the reproduced digital data.

In a prior-art recording and reproducing system, first data blocks (referred to as the data blocks "A" hereinafter) such as transport packets conforming to the MPEG standards are converted into second data blocks (referred to as the data blocks "B" hereinafter) differing in size from the data blocks "A", and the data blocks "B" are recorded on a recording medium. During playback, the original data blocks "A" are reconstructed or recovered from corresponding reproduced data blocks "B".

In the prior-art system, to enable the reconstruction of the data blocks "A" during playback, the order of the blocks "A" of input data is maintained in a sequence of the data blocks "B" which are recorded on the recording medium.

Generally, input data has a variable transmission rate. It is known to add dummy data blocks to input data to compensate for a variation in the transmission rate of the input data. Then, the dummy-added input data is recorded on a recording medium block by block. In this case, the data blocks recorded on the recording medium are of two types corresponding to the original input data and the dummy data respectively.

It is also known that special data for special playback such as high-speed playback is added to input data before the input data is recorded on a recording medium block by block. In this case, the data blocks recorded on the recording medium are of two types corresponding to the original input data and the special data respectively.

During the recording of data blocks "B" of plural different types on a recording medium, the header of every data block "B" is loaded with an identification signal representing the type of the data block "B". During a given playback process on a recording medium storing data blocks of plural different types, only data blocks of a desired type are extracted from reproduced data blocks, and are outputted as a desired reproduced signal. Specifically, the identification signal in the header of every reproduced data block is examined to detect the type thereof, and thereby the data blocks of the desired type are discriminated from the reproduced data blocks of the other types.

During playback under some poor conditions, an error rate of reproduced data is great so that the order of reproduced data blocks "B" deviates from a correct order for the reconstruction of data blocks "A". In this case, a sequence of the reproduced data blocks "B" tends to contain wrong data blocks. Decoding the wrong data blocks "B" into corresponding data blocks "A" results in a reduction in quality of information recovered from the reproduced data blocks "B". The wrong data blocks "B" tend to break operation of an MPEG decoder.

SUMMARY OF THE INVENTION

It is a first object of this invention to provide an improved apparatus for reproducing digital data.

It is a second object of this invention to provide an improved method of reproducing digital data.

A first aspect of this invention provides a digital data reproducing apparatus comprising first means for reproducing first data blocks from a recording medium, the first data blocks containing respective identification information pieces for discriminating the first data blocks from each other; second means for deciding whether or not each of the first data blocks reproduced by the first means is correct in response to the identification information piece therein; third means for discarding each first data block which is decided to be not correct by the second means; and fourth means for generating second data blocks from the first data blocks which are reproduced by the first means and which are not discarded by the third means, the second data blocks differing in size from the first data blocks.

A second aspect of this invention provides a digital data reproducing apparatus comprising first means for reproducing first data blocks from a recording medium, the first data blocks containing respective identification information pieces for discriminating the first data blocks from each other; second means for predicting the identification information pieces in the first data blocks reproduced by the first means, and generating predicted information pieces representing results of the predicting; third means for adding the predicted information pieces generated by the second means to the first data blocks reproduced by the first means to convert the first data blocks to second data blocks; and fourth means for generating third data blocks from the second data blocks generated by the third means, the third data blocks differing in size from the first data blocks.

A third aspect of this invention is based on the second aspect thereof, and provides a digital data reproducing apparatus further comprising fifth means for correcting errors in each of the first data blocks reproduced by the first means; sixth means for deciding whether or not at least one error which has not been corrected by the fifth means remains in each of the first data blocks reproduced by the first means, and generating an error flag signal representing a result of the deciding for each of the first data blocks reproduced by the first means; and seventh means for adding the error flag signals generated by the sixth means to the second data blocks generated by the third means.

A fourth aspect of this invention is based on the first aspect thereof, and provides a digital data reproducing apparatus wherein the second means comprises means for predicting the identification information pieces in the first data blocks reproduced by the first means to generate predicted information pieces; means for detecting the identification information pieces in the first data blocks reproduced by the first means to generate detected information pieces; and means for deciding that each first data block is correct when the related predicted information piece and the related detected information piece are equal to each other.

A fifth aspect of this invention is based on the fourth aspect thereof, and provides a digital data reproducing apparatus wherein the second means further comprises means for deciding that each first data block is not correct when the related predicted information piece and the related detected information piece are different from each other.

A sixth aspect of this invention is based on the fifth aspect thereof, and provides a digital data reproducing apparatus wherein each of the second data blocks corresponds to a set of plural first data blocks among the first data blocks generated by the first means, and the third means comprises means for, in cases where a first data block is decided to be not correct and a detected information piece related to said first data block represents that said first data block is a head data block in a set corresponding to one second data block, discarding at least one previous first data block immediately preceding said first data block, using said first data block as a correct first data block, and adjusting a predicted information piece for a next first data block to represent that the next first data block is a data block immediately following the head data block.

A seventh aspect of this invention is based on the fifth aspect thereof, and provides a digital data reproducing apparatus wherein each of the second data blocks corresponds to a set of plural first data blocks among the first data blocks generated by the first means, and the third means comprises means for, in cases where a first data block is decided to be not correct and a detected information piece related to said first data block represents that said first data block differs from a head data block in a set corresponding to one second data block, discarding said first data block and at least one immediately preceding first data block in said set, and adjusting a predicted information piece for a next first data block to represent that the next first data block is a head data block in a set.

An eighth aspect of this invention is based on the first aspect thereof, and provides a digital data reproducing apparatus further comprising fifth means for correcting errors in each of the first data blocks reproduced by the first means; sixth means for deciding whether or not at least one error which has not been corrected by the fifth means remains in each of the first data blocks reproduced by the first means, and generating an error flag signal representing a result of the deciding for each of the first data blocks reproduced by the first means; seventh means provided in the second means for predicting the identification information pieces in the first data blocks reproduced by the first means to generate predicted information pieces; eighth means provided in the second means for detecting the identification information pieces in the first data blocks reproduced by the first means to generate detected information pieces; and ninth means provided in the second means for deciding whether or not each of the first data blocks reproduced by the first means is correct in response to the error flag signal, the predicted information piece, and the detected information piece.

A ninth aspect of this invention is based on the eighth aspect thereof, and provides a digital data reproducing apparatus wherein the second means comprises means for deciding that each first data block is correct in cases where the related error flag signal represents error absence, and where the related predicted information piece and the related detected information piece are equal to each other.

A tenth aspect of this invention is based on the eighth aspect thereof, and provides a digital data reproducing apparatus wherein the second means comprises means for deciding that the predicted information piece is wrong in cases where the related error flag signal represents error absence, and where the related predicted information piece and the related detected information piece are different from each other; and the second means comprises means for deciding that the detected information piece is wrong in cases where the related error flag signal represents error presence, and where the related predicted information piece and the related detected information piece are different from each other.

An eleventh aspect of this invention is based on the eighth aspect thereof, and provides a digital data reproducing apparatus wherein each of the second data blocks corresponds to a set of plural first data blocks among the first data blocks generated by the first means: the second means comprises means for deciding that the predicted information piece is wrong in cases where the related error flag signal represents error absence, and where the related predicted information piece and the related detected information piece are different from each other; the third means comprises means for, in cases where a first data block is decided to be not correct and a detected information piece related to said first data block represents that said first data block is a head data block in a set corresponding to one second data block, discarding at least one previous first data block immediately preceding said first data block, using said first data block as a correct first data block, and adjusting a predicted information piece for a next first data block to represent that the next first data block is a data block immediately following the head data block; and the third means comprises means for, in cases where a first data block is decided to be not correct and a detected information piece related to said first data block represents that said first data block differs from a head data block in a set corresponding to one second data block, discarding said first data block and at least one immediately preceding first data block in said set, and adjusting a predicted information piece for a next first data block to represent that the next first data block is a head data block in a set.

A twelfth aspect of this invention is based on the eighth aspect thereof, and provides a digital data reproducing apparatus wherein the second means comprises means for deciding that the detected information piece is wrong in cases where the related error flag signal represents error presence, and where the related predicted information piece and the related detected information piece are different from each other; and the third means for, in cases where the detected information piece is decided to be wrong, using a first data block related to the detected information piece as a first data block corresponding to the predicted information piece.

A thirteenth aspect of this invention is based on the fourth aspect thereof, and provides a digital data reproducing apparatus wherein the predicting means comprises a counter responding to each of the first data blocks reproduced by the first means.

A fourteenth aspect of this invention provides a method comprising the steps of reproducing first data blocks from a recording medium, the first data blocks containing respective identification information pieces for discriminating the first data blocks from each other; deciding whether or not each of the reproduced first data blocks is correct in response to the identification information piece therein; discarding each reproduced first data block which is decided to be not correct; and generating second data blocks from the reproduced first data blocks which are not discarded, the second data blocks differing in size from the first data blocks.

A fifteenth aspect of this invention provides a method comprising the steps of reproducing first data blocks from a recording medium, the first data blocks containing respective identification information pieces for discriminating the first data blocks from each other; predicting the identification information pieces in the reproduced first data blocks, and generating predicted information pieces representing results of the predicting; adding the predicted information pieces to the reproduced first data blocks to convert the first data blocks to second data blocks; and generating third data blocks from the second data blocks, the third data blocks differing in size from the first data blocks.

A sixteenth aspect of this invention is based on the fifteenth aspect thereof, and provides a method further comprising the steps of correcting errors in each of the reproduced first data blocks; deciding whether or not at least one error which has not been corrected remains in each of the reproduced first data blocks, and generating an error flag signal representing a result of the deciding for each of the reproduced first data blocks; and adding the error flag signals to the second data blocks.

A seventeenth aspect of this invention is based on the fourteenth aspect thereof, and provides a method wherein the deciding step comprises predicting the identification information pieces in the reproduced first data blocks to generate predicted information pieces; detecting the identification information pieces in the reproduced first data blocks to generate detected information pieces; and deciding that each first data block is correct when the related predicted information piece and the related detected information piece are equal to each other.

An eighteenth aspect of this invention is based on the seventeenth aspect thereof, and provides a method wherein the predicting step comprises counting the reproduced first data blocks.

A nineteenth aspect of this invention provides an apparatus comprising first means for sequentially reproducing sets each having a given number of first equal-size data blocks as members from a recording medium, wherein the first data blocks in each of the sets contain respective identification information pieces for discriminating the first data blocks from each other in the set; second means for predicting an identification information piece in a present first data block reproduced by the first means in response to a previous first data block reproduced by the first means, and for generating a prediction signal representative of a result of the predicting; third means for detecting the identification information in the present first data block reproduced by the first means, and for generating a detection signal representative of a result of the detecting; fourth means for comparing the prediction signal generated by the second means and the detection signal generated by the third means; fifth means for deciding whether each of the sets reproduced by the first means is complete or incomplete regarding members thereof in response to a result of the comparing by the fourth means; sixth means for discarding the first data blocks in the sets which are decided to be incomplete by the fifth means; and seventh means for converting each of the sets which are decided to be complete by the fifth means into at least one second data block differing in size from the first data blocks.

A twentieth aspect of this invention provides a method comprising the steps of sequentially reproducing sets each having a given number of first equal-size data blocks as members from a recording medium, wherein the first data blocks in each of the sets contain respective identification information pieces for discriminating the first data blocks from each other in the set; predicting an identification information piece in a present first data block in response to a previous first data block, and generating a prediction signal representative of a result of the predicting; detecting the identification information in the present first data block, and generating a detection signal representative of a result of the detecting; comparing the prediction signal and the detection signal; deciding whether each of the reproduced sets is complete or incomplete regarding members thereof in response to a result of the comparing; discarding the first data blocks in the reproduced sets which are decided to be incomplete; and converting each of the reproduced sets which are decided to be complete into at least one second data block differing in size from the first data blocks.

DESCRIPTION OF THE PREFERRED EMBODIMENTS

Data block conversion implemented in a recording stage will be explained hereinafter for a better understanding of this invention.

Digital data to be recorded is divided into first blocks "A" which form a sequence. The first data blocks "A" are converted into second data blocks "B" differing in size from the data blocks "A". A sequence of second data blocks "B" originating from the first data blocks "A" is recorded on a recording medium. Accordingly, the recording medium stores the second data blocks "B".

Figure 1:
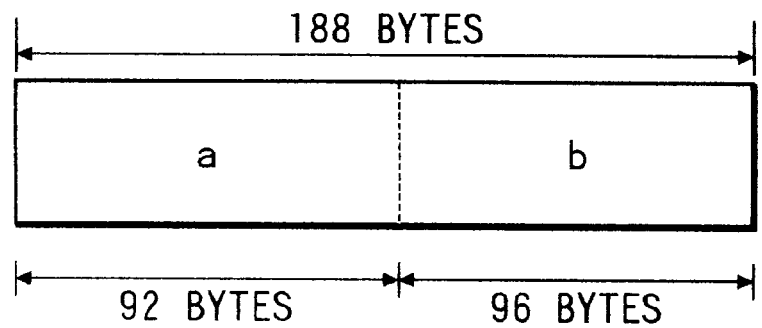
FIG. 1 is a diagram of a data block.
Figure 2:
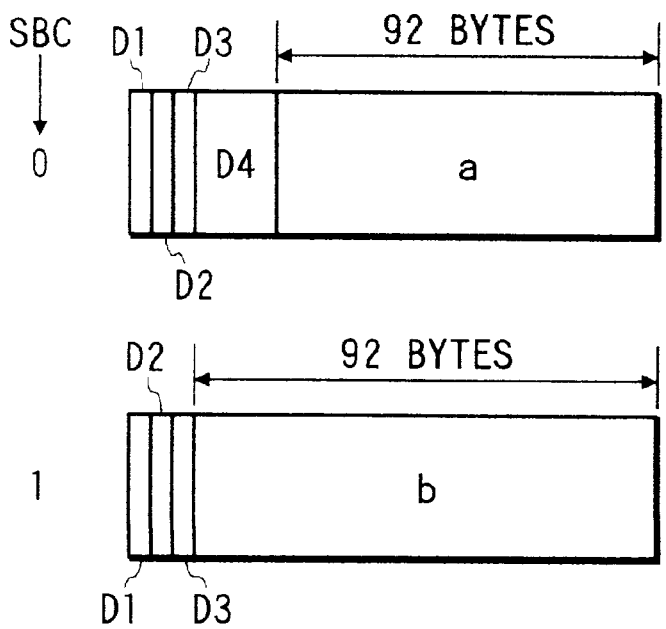
FIG. 2 is a diagram of a set of data blocks which are generated from the data block in FIG. 1.

With reference to FIGS. 1 and 2, an explanation will be given of a first example of the conversion of data blocks "A" into data blocks "B". As shown in FIG. 1, every data block "A" has a size corresponding to 188 bytes. Every data block "A" is converted into two successive data blocks (a pair of first and second data blocks) "B" shown in FIG. 2 and each having a size corresponding to 99 bytes. Every data block "A" is divided into the former 92-byte portion "a" and the latter 96-byte portion "b". As shown in FIG. 2, the first data block "B" has a sequence of a 1-byte first main header D1, a 1-byte second main header D2, a 1-byte helper information area (a 1-byte auxiliary information area) D3, a 4-byte time stamp D4, and a 92-byte data area loaded with the former 92-byte portion "a" of the data block "A". As shown in FIG. 2, the second data block "B" has a sequence of a 1-byte first main header D1, a 1-byte second main header D2, a 1-byte helper information area (a 1-byte auxiliary information area) D3, and a 96-byte data area loaded with the latter 96-byte portion "b" of the data block "A". The first main header D1 of the first data block "B" contains a sync block count (an identification signal or an identification information piece) SBC of "0". The first main header D1 of the second data block "B" contains a sync block count (an identification signal or an identification information piece) SBC of "1". Generally, the sync block count SBC of "0" indicates that the related data block "B" is a first data block in a pair of successive data blocks "B". On the other hand, the sync block count SBC of "1" indicates that the related data block "B" is a second data block in a pair of successive data blocks "B".

Figure 3:
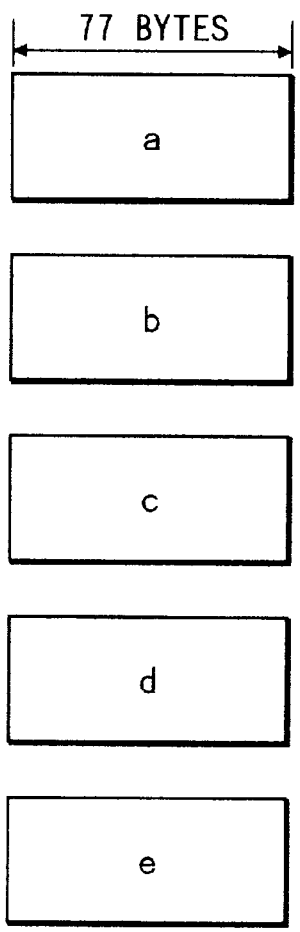
FIG. 3 is a diagram of a set of data blocks.
Figure 4:
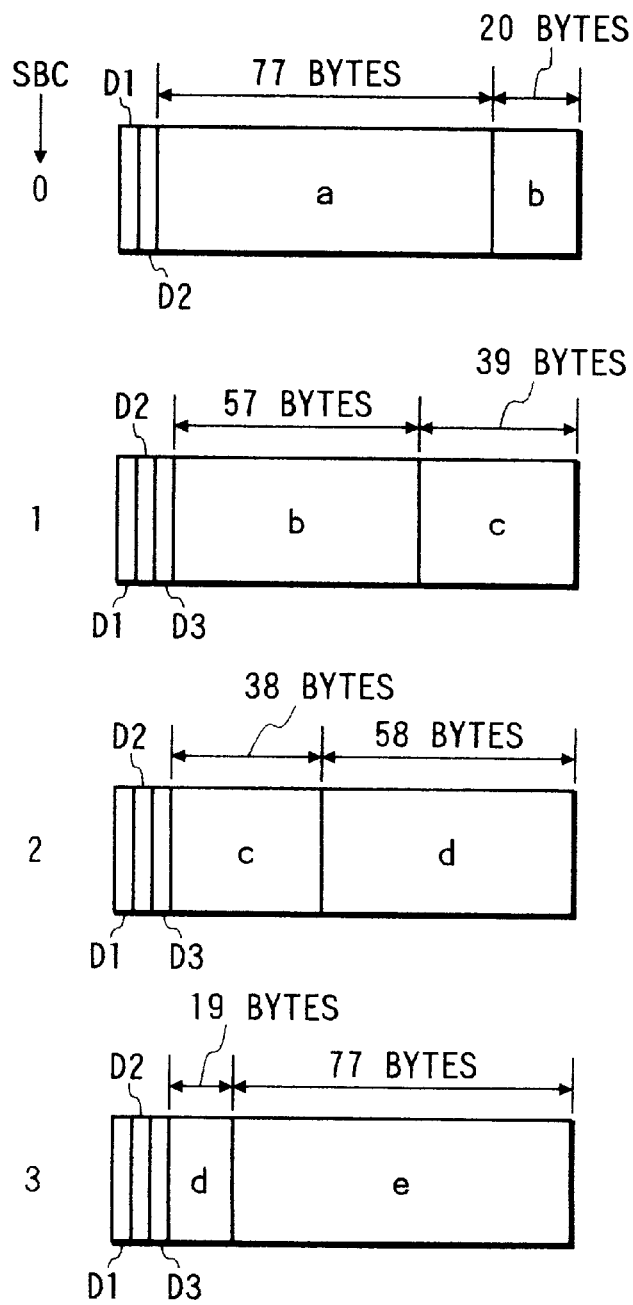
FIG. 4 is a diagram of a set of data blocks which are generated from the data blocks in FIG. 3.

With reference to FIGS. 3 and 4, an explanation will be given of a second example of the conversion of data blocks "A" into data blocks "B". As shown in FIG. 3, every data block "A" has a size corresponding to 77 bytes. Five successive data blocks (first, second, third, fourth, and fifth data blocks) "A" are converted into four successive data blocks (first, second, third, and fourth data blocks) "B" shown in FIG. 4 and each having a size corresponding to 99 bytes. As shown in FIG. 4, the first data block "B" has a sequence of a 1-byte first main header D1, a 1-byte second main header D2, a 77-byte data area, and a 20-byte data area. The 77-byte data area is loaded with the 77-byte data "a" in the first data block "A". The 20-byte area is loaded with the former 20-byte portion of the data "b" in the second data block "A". As shown in FIG. 4, the second data block "B" has a sequence of a 1-byte first main header D1, a 1-byte second main header D2, a 1-byte helper information area (a 1-byte auxiliary information area) D3, a 57-byte data area, and a 39-byte data area. The 57-byte data area is loaded with the latter 57-byte portion of the data "b" in the second data block "A". The 39-byte area is loaded with the former 39-byte portion of the data "c" in the third data block "A". As shown in FIG. 4, the third data block "B" has a sequence of a 1-byte first main header D1, a 1-byte second main header D2, a 1-byte helper information area (a 1-byte auxiliary information area) D3, a 38-byte data area, and a 58-byte data area. The 38-byte data area is loaded with the latter 38-byte portion of the data "c" in the third data block "A". The 58-byte area is loaded with the former 58-byte portion of the data "d" in the fourth data block "A". As shown in FIG. 4, the fourth data block "B" has a sequence of a 1-byte first main header D1, a 1-byte second main header D2, a 1-byte helper information area (a 1-byte auxiliary information area) D3, a 19-byte data area, and a 77-byte data area. The 19-byte data area is loaded with the latter 19-byte portion of the data "d" in the fourth data block "A". The 77-byte area is loaded with the 77-byte data "e" in the fifth data block "A". The first main header D1 of the first data block "B" contains a sync block count (an identification signal or an identification information piece) SBC of "0". The first main header D1 of the second data block "B" contains a sync block count (an identification signal or an identification information piece) SBC of "1". The first main header D1 of the third data block "B" contains a sync block count (an identification signal or an identification information piece) SBC of "2". The first main header D1 of the fourth data block "B" contains a sync block count (an identification signal or an identification information piece) SBC of "3". Generally, the sync block count SBC of "0" indicates that the related data block "B" is a first data block in a set of four successive data blocks "B". The sync block count SBC of "1" indicates that the related data block "B" is a second data block in a set of four successive data blocks "B". The sync block count SBC of "2" indicates that the related data block "B" is a third data block in a set of four successive data blocks "B". The sync block count SBC of "3" indicates that the related data block "B" is a fourth data block in a set of four successive data blocks "B".

Figure 5:
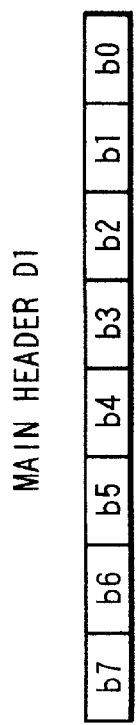
FIG. 5 is a diagram of a first main header D1 in FIG. 2 or 4.

As shown in FIG. 5, a first main header D1 of each of data blocks "B" in FIGS. 2 and 4 has a sequence of eight bits b7, b6, b5, b4, b3, b2, b1, and b0. A sync block count SBC is placed in the bits b1 and b0 in a first main header D1. The bits b3 and b2 in a first main header D1 are loaded with information of a type of data contained in a related data block "B". The bits b7, b6, b5, and b4 in a first main header D1 are loaded with other information.

Six helper information areas (six auxiliary information areas) D3 in data blocks "B" (see FIGS. 2 and 4) compose one set loaded with pack data representing title names, time, and various information pieces related to recorded contents. A time stamp D4 in each data block "B" (see FIG. 2) is loaded with information representing a moment at which a related transport pack et should be outputted. In other words, the time stamp D4 represents a correct time position of the related transport packet in a packet stream.

A set of four data blocks "B" in FIG. 4 may be modified as follows. According to a first modification, a helper information area (an auxiliary information area) D3 is provided in a first data block "B" rather than a fourth data block "B". According to a second modification, a 3-byte helper information area (a 3-byte auxiliary information area) is provided in one of the data blocks while the other data blocks do not have any helper information areas.

First Embodiment

A first embodiment of this invention is designed to handle data blocks which result from the data block conversion explained with reference to FIGS. 1 and 2.

Figure 6:
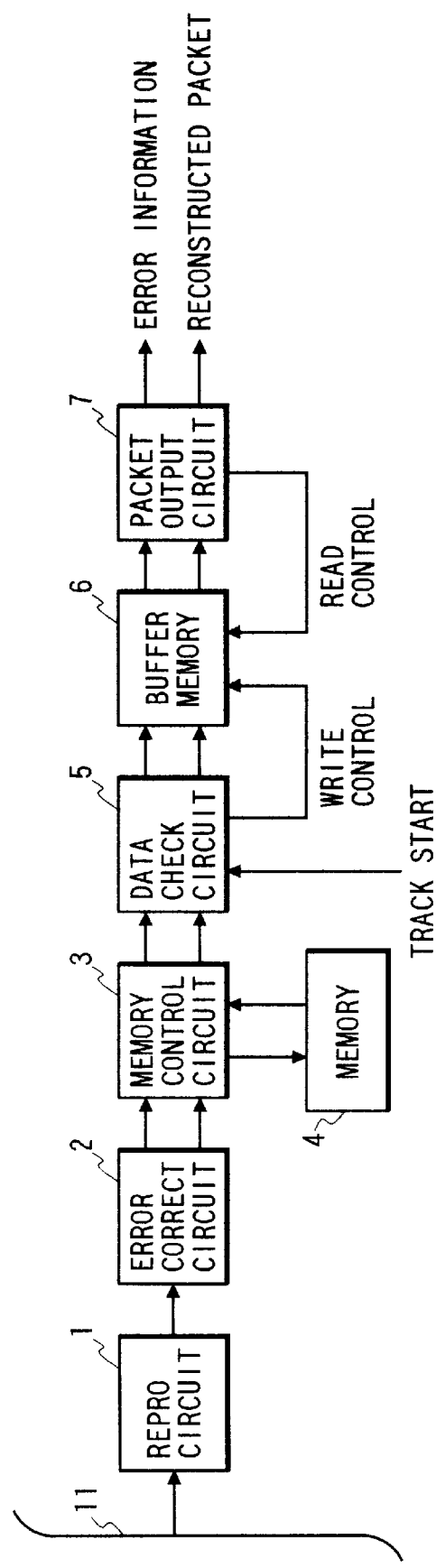
FIG. 6 is a block diagram of a digital data reproducing apparatus according to a first embodiment of this invention.

FIG. 6 shows a digital data reproducing apparatus according to the first embodiment of this invention. The digital data reproducing apparatus of FIG. 6 includes a magnetic tape 11. The magnetic tape 11 stores data blocks "B" which are generated from data blocks "A" according to the data block conversion explained with reference to FIGS. 1 and 2. The data blocks "B" are sync blocks, respectively. The data blocks "A" are packets, respectively.

With reference to FIG. 6, a reproducing circuit 1 sequentially reproduces the sync blocks from the magnetic tape 11. The reproducing circuit 1 sequentially outputs the reproduced sync blocks to an error correction circuit 2. Generally, the reproduced sync blocks are sequentially transmitted from the error correction circuit 2 to a memory 4 via a memory control circuit 3, and are sequentially written into the memory 4. Specifically, the memory control circuit 3 sequentially receives the reproduced sync blocks from the error correction circuit 2, and sequentially stores the reproduced sync blocks into the memory 4. A given number of successive reproduced sync blocks are periodically collected in the memory 4. Basically, the error correction circuit 2 subjects every given number of reproduced sync blocks in the memory 4 to error detection and error correction, thereby changing the reproduced sync blocks into correction-resultant sync blocks. Specifically, the error correction circuit 2 accesses the memory 4 via the memory control circuit 3, and detects and corrects an error or errors in every given number of reproduced sync blocks in response to error detecting and correcting information (parity information) in the reproduced sync blocks. As a result, the reproduced sync blocks in the memory 4 are corrected into correction-resultant sync blocks. The error correction circuit 2 generates an error flag f2 representing whether or not at least one error which has not been corrected remains in each of the correction-resultant sync blocks in the memory 4. The error correction circuit 2 outputs the error flag f2 to the memory control circuit 3 for every correction-resultant sync block. The memory control circuit 3 stores the error flag f2 into the memory 4 for every correction-resultant sync block.

The memory control circuit 3 sequentially reads out the correction-resultant sync blocks and the related error flags f2 from the memory 4. The memory control circuit 3 refers to data type information in the first main header D1 of each of the correction-resultant sync blocks. The memory control circuit 3 detects whether or not data in each of the correction-resultant sync blocks is of a desired type on the basis of the data type information. The memory control circuit 3 sequentially accepts correction-resultant sync blocks containing data of the desired type, and sequentially feeds the accepted correction-resultant sync blocks and the related error flags f2 to a data check circuit 5. On the other hand, the memory control circuit 3 rejects or discards correction-resultant sync blocks containing data of types different from the desired type, and inhibits the rejected or discarded correction-resultant sync blocks and the related error flags f2 from travelling to the data check circuit 5.

The data check circuit 5 receives a signal of every track start from a suitable device (not shown). Every track start corresponds to a head of data on a track on the recording medium 11. The data check circuit 5 decides whether or not every sync block fed from the memory control circuit 3 is acceptably correct in response to the present sync block, previous sync blocks, and the track start signal. When the data check circuit 5 decides that a current sync block is acceptably correct, the data check circuit 5 controls a buffer memory 6 and thereby writes the current sync block and the related error flag f2 into the buffer memory 6. When the data check circuit 5 decides that a current sync block is not acceptably correct, the data check circuit 5 controls the buffer memory 6 and thereby inhibits the current sync block and the related error flag f2 from being written into the buffer memory 6. In this case, the current sync block and the related error flag f2 are discarded.

A packet output circuit 7 accesses the buffer memory 6 to read out a time stamp from a sync block or sync blocks in the buffer memory 6. At a moment designated by the readout time stamp, the packet output circuit 7 reads out 1-packet-corresponding data from a pair of the successive sync blocks in the buffer memory 6, and outputs the readout data as a packet corresponding to a data block "A". Thus, the packet output circuit 7 reconstructs data blocks "A" from data blocks "B" (reproduced sync blocks). In addition, the packet output circuit 7 reads out an error flag or flags f2 from the sync block or sync blocks in the buffer memory 6, and outputs the readout error flag or flags f2 as information of the reliability of the output packet.

Figures 7, 8:
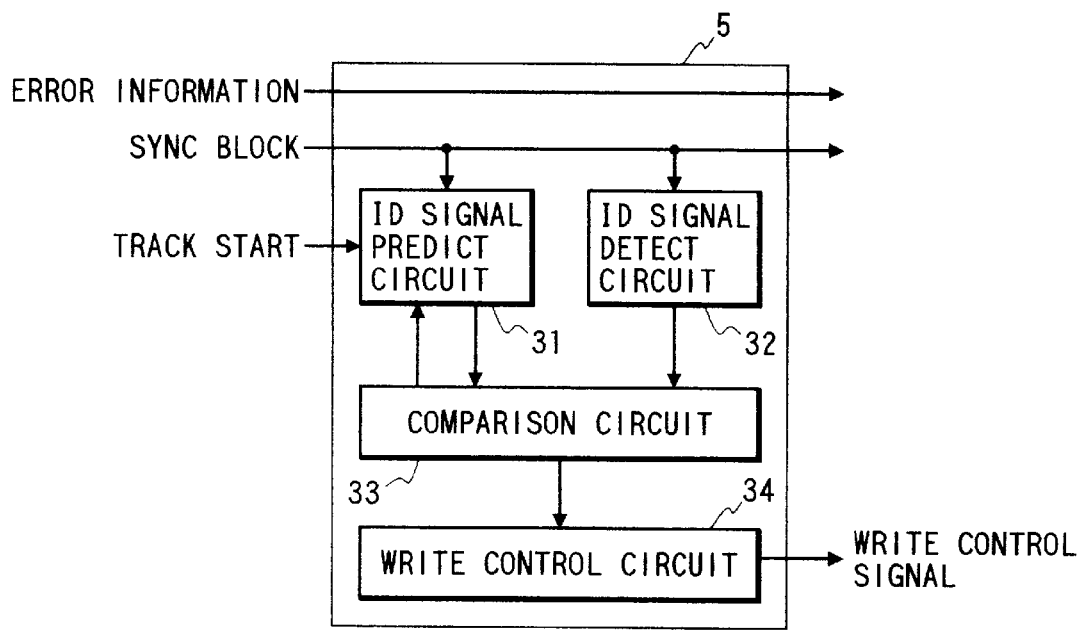
FIG. 7 is a block diagram of a data check circuit in FIG. 6.
FIG. 8 is a time-domain diagram of an example of a reproduced data block, a predicted value, a detected value, a decision result, and a final output packet which occur in the apparatus of FIG. 6.

As shown in FIG. 7, the data check circuit 5 includes an identification signal prediction circuit 31, an identification signal detection circuit 32, a comparison circuit 33, and a write control circuit 34. The identification signal prediction circuit 31 sequentially receives reproduced sync blocks from the memory control circuit 3 (see FIG. 6). The identification signal prediction circuit 31 receives the track start signal. The identification signal detection circuit 32 sequentially receives reproduced sync blocks from the memory control circuit 3 (see FIG. 6). The identification signal prediction circuit 31 and the identification signal detection circuit 32 are connected to the comparison circuit 33. The comparison circuit 33 is connected to the write control circuit 34. The write control circuit 34 is connected to the buffer memory 6 (see FIG. 6).

The identification signal prediction circuit 31 generates a predicted identification signal representative of an expected value of the sync block count SBC in a current sync block on the basis of the track start signal and the sync block counts SBC in previous sync blocks. The identification signal prediction circuit 31 outputs the predicted identification signal to the comparison circuit 33.

The identification signal detection circuit 32 extracts the sync block count SBC from a current sync block. The identification signal detection circuit 32 outputs the extracted sync block count SBC to the comparison circuit 33 as a detected identification signal.

For every sync block outputted from the memory control circuit 3, the comparison circuit 33 compares the predicted identification signal and the detected identification signal to decide whether or not the sync block is acceptably correct. The comparison circuit 33 informs the write control circuit 34 of the comparison result, that is, the result of the decision as to whether or not every sync block is acceptably correct.

The write control circuit 34 selectively permits and inhibits the writing of every sync block and a related error flag f2 into the buffer memory 6 in response to the comparison result fed from the comparison circuit 33. The inhibition of the writing of a sync block and a related error flag f2 results in the discard thereof.

The write control circuit 34 selectively enables a present sync block and a present error flag f2 to be written over the immediately-preceding sync block and the immediately-preceding error flag f2 in the buffer memory 6 in response to the comparison result fed from the comparison circuit 33. The over-writing discards the immediately-preceding sync block and the immediately-preceding error flag f2.

Specifically, the identification signal prediction circuit 31 includes a 1-bit counter outputting a signal which can change between "0" and "1". The output signal of the 1-bit counter is reset to "0" each time the track start signal is inputted thereinto. The output signal of the 1-bit counter is updated each time a sync block is inputted thereinto. Accordingly, under normal conditions, the output signal of the 1-bit counter periodically changes as "0", "1", "0", "1", "0", "1", . . . , and this change correctly corresponds to a variation (a change) among the sync block counts SBC in sync blocks outputted from the memory control circuit 3 (see FIG. 6). The output signal of the 1-bit counter is fed to the comparison circuit 33 as the predicted identification signal. As will be explained later, the 1-bit counter can be adjusted by the comparison circuit 33.

The identification signal detection circuit 32 samples every sync block at a timing which corresponds to the first main header D1 in the sync block. The identification signal detection circuit 32 decides the sampling timing by referring to a signal representing a timing at which the memory control circuit 3 (see FIG. 6) reads out a sync block from the memory 4 (see FIG. 6). As a result of the sampling, the identification signal detection circuit 32 extracts the sync block count SB from every sync block. The identification signal detection circuit 32 outputs the extracted sync block count SBC to the comparison circuit 33 as the detected identification signal.

The comparison circuit 33 will be further explained. When both the predicted identification signal and the detected identification signal are "0", the comparison circuit 33 decides that the present sync block is acceptably correct. The comparison circuit 33 informs the write control circuit 34 that the present sync block is acceptably correct. In this case, the write control circuit 34 permits the present sync block and the related error flag f2 to be written into the buffer memory 6 (see FIG. 6).

When both the predicted identification signal and the detected identification signal are "1", the comparison circuit 33 decides that the present sync block is acceptably correct. The comparison circuit 33 informs the write control circuit 34 that the present sync block is acceptably correct. In this case, the write control circuit 34 permits the present sync block and the related error flag f2 to be written into the buffer memory 6 (see FIG. 6).

When the predicted identification signal and the detected identification signal are "0" and "1" respectively, the comparison circuit 33 decides that the present sync block is not acceptably correct. The comparison circuit 33 informs the write control circuit 34 that the present sync block is not acceptably correct. In this case, the write control circuit 34 inhibits the present sync block and the related error flag f2 from being written into the buffer memory 6 (see FIG. 6). Thus, the present sync block and the related error flag f2 are discarded. In addition, the comparison circuit 33 adjusts the 1-bit counter in the identification signal prediction circuit 31 so that the output signal of the 1-bit counter will move to a normal state or a correct state.

A further explanation will be given of the case where the predicted identification signal and the detected identification signal are "0" and "1" respectively. It is assumed that the detected identification signal is correct while the predicted identification signal is wrong. The present sync block is a second data block in a pair of successive data blocks "B" corresponding to one data block "A" since the correct identification signal (the sync block count SBC) is "1". A first data block in this pair of successive data blocks "B" is thought to be absent, and this pair of successive data blocks "B" is incomplete. Thus, it is difficult to accurately reconstruct the data block "A" corresponding to this pair. Accordingly, in this case, the present sync block and the related error flag f2 are discarded. In addition, the comparison circuit 33 sets the output signal of the 1-bit counter in the identification signal prediction circuit 31 to "0" for a next sync block.

FIG. 8 shows an example of time-domain conditions in which the predicted identification signal and the detected identification signal become "0" and "1" respectively at a certain moment. With reference to FIG. 8, there occurs a sequence of sync blocks (data blocks "B") 0A, 1B, 0C, 1D, 1X, 0E, 1F, 0G, and 1H outputted from the memory control circuit 3 to the data check circuit 5. For the sync block 0A, both the predicted identification signal (the predicted value) and the detected identification signal (the detected value) are "0". In this case, the comparison result or the decision result provided by the comparison circuit 33 is "0", representing that the sync block 0A is acceptably correct. For the sync block 1B, both the predicted identification signal (the predicted value) and the detected identification signal (the detected value) are "1". In this case, the comparison result or the decision result provided by the comparison circuit 33 is "0", representing that the sync block 1B is acceptably correct. For the sync block 0C, both the predicted identification signal (the predicted value) and the detected identification signal (the detected value) are "0". In this case, the comparison result or the decision result provided by the comparison circuit 33 is "0", representing that the sync block 0C is acceptably correct. For the sync block 1D, both the predicted identification signal (the predicted value) and the detected identification signal (the detected value) are "1". In this case, the comparison result or the decision result provided by the comparison circuit 33 is "0", representing that the sync block 1D is acceptably correct. For the sync block 1X, the predicted identification signal (the predicted value) and the detected identification signal (the detected value) are "0" and "1" respectively. In this case, the comparison result or the decision result provided by the comparison circuit 33 is "1", representing that the sync block 1X is not acceptably correct. Thus, the sync block 1X and a related error flag f2 are discarded. For the sync block 0E, both the predicted identification signal (the predicted value) and the detected identification signal (the detected value) are "0". In this case, the comparison result or the decision result provided by the comparison circuit 33 is "0", representing that the sync block 0E is acceptably correct. For the sync block 1F, both the predicted identification signal (the predicted value) and the detected identification signal (the detected value) are "1". In this case, the comparison result or the decision result provided by the comparison circuit 33 is "0", representing that the sync block 1F is acceptably correct. For the sync block 0G, both the predicted identification signal (the predicted value) and the detected identification signal (the detected value) are "0". In this case, the comparison result or the decision result provided by the comparison circuit 33 is "0", representing that the sync block 0G is acceptably correct. For the sync block 1H, both the predicted identification signal (the predicted value) and the detected identification signal (the detected value) are "1". In this case, the comparison result or the decision result provided by the comparison circuit 33 is "0", representing that the sync block 1H is acceptably correct.

With reference to FIG. 8, a packet (a data block "A") AB is reconstructed from the sync blocks 0A and 1B. A packet (a data block "A") CD is reconstructed from the sync blocks 0C and 1D. As previously indicated, the sync block 1X is discarded. A packet (a data block "A") EF is reconstructed from the sync blocks 0E and 1F. A packet (a data block "A") GH is reconstructed from the sync blocks 0G and 1H.

When the predicted identification signal and the detected identification signal are "1" and "0" respectively, it is indicated that the present sync block is a first data block in a pair of successive data blocks while the immediately-preceding sync block is also a first data block in another pair of successive data blocks. Here, the immediately-preceding sync block is in the buffer memory 6. A second sync block to form a pair with the immediately-preceding sync block is thought to be absent, and the pair is incomplete. Thus, it is difficult to accurately reconstruct a data block "A" corresponding to the pair including the immediately-preceding sync block. Accordingly, in this case, the write control circuit 34 controls the buffer memory 6 in response to the comparison result fed from the comparison circuit 33 so that the immediately-preceding sync block and the related error flag f2 will be discarded. Specifically, the write control circuit 34 moves back a write address for the buffer memory 6 by a given value, and enables the present sync block to be written over the immediately-preceding sync block in the buffer memory 6. In addition, the write control circuit 34 enables the present error flag f2 to be written over the immediately-preceding error flag f2 in the buffer memory 6. On the other hand, the comparison circuit 33 adjusts the 1-bit counter in the identification signal prediction circuit 31 so that the output signal of the 1-bit counter will move to a normal state or a correct state. Specifically, the comparison circuit 33 sets the output signal of the 1-bit counter in the identification signal prediction circuit 31 to "1" for a next sync block. In summary, when the predicted identification signal and the detected identification signal are "1" and "0" respectively, it is considered that the immediately-preceding sync block is not acceptably correct.

Figure 9:
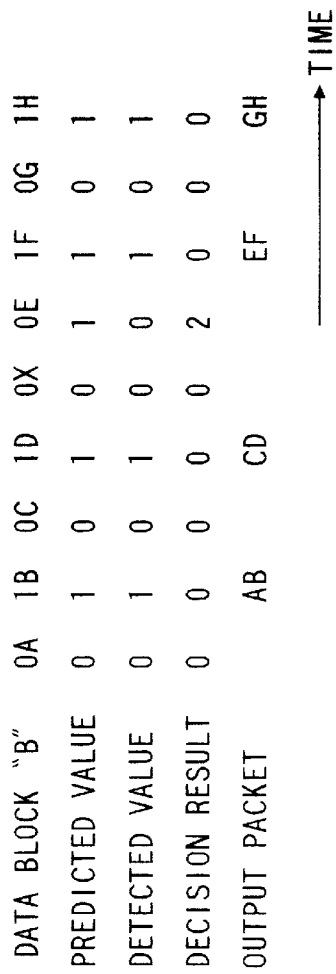
FIG. 9 is a time-domain diagram of an example of a reproduced data block, a predicted value, a detected value, a decision result, and a final output packet which occur in the apparatus of FIG. 6.

FIG. 9 shows an example of time-domain conditions in which the predicted identification signal and the detected identification signal become "1" and "0" respectively at a certain moment. With reference to FIG. 9, there occurs a sequence of sync blocks (data blocks "B") 0A, 1B, 0C, 1D, 1X, 0E, 1F, 0G, and 1H outputted from the memory control circuit 3 to the data check circuit 5. For the sync block 0A, both the predicted identification signal (the predicted value) and the detected identification signal (the detected value) are "0". In this case, the comparison result or the decision result provided by the comparison circuit 33 is "0", representing that the sync block 0A is acceptably correct. For the sync block 1B, both the predicted identification signal (the predicted value) and the detected identification signal (the detected value) are "1". In this case, the comparison result or the decision result provided by the comparison circuit 33 is "0", representing that the sync block 1B is acceptably correct. For the sync block 0C, both the predicted identification signal (the predicted value) and the detected identification signal (the detected value) are "0". In this case, the comparison result or the decision result provided by the comparison circuit 33 is "0", representing that the sync block 0C is acceptably correct. For the sync block 1D, both the predicted identification signal (the predicted value) and the detected identification signal (the detected value) are "1". In this case, the comparison result or the decision result provided by the comparison circuit 33 is "0", representing that the sync block 1D is acceptably correct. For the sync block 0X, both the predicted identification signal (the predicted value) and the detected identification signal (the detected value) are "0". In this case, the comparison result or the decision result provided by the comparison circuit 33 is "0", representing that the sync block 0X is acceptably correct. The sync block 0X and a related error flag f2 are written into the buffer memory 6. For the sync block 0E, the predicted identification signal (the predicted value) and the detected identification signal (the detected value) are "1" and "0" respectively. In this case, the comparison result or the decision result provided by the comparison circuit 33 is "2", representing the absence of a second sync block to form a pair with the sync block 0X. The sync block 0E is written over the sync block 0X in the buffer memory 6 so that the sync block 0X is discarded. In addition, an error flag f2 related to the sync block 0E is written over the error flag f2 related to the sync block 0X so that the latter error flag f2 is discarded. For the sync block 1F, both the predicted identification signal (the predicted value) and the detected identification signal (the detected value) are "1". In this case, the comparison result or the decision result provided by the comparison circuit 33 is "0", representing that the sync block 1F is acceptably correct. For the sync block 0G, both the predicted identification signal (the predicted value) and the detected identification signal (the detected value) are "0". In this case, the comparison result or the decision result provided by the comparison circuit 33 is "0", representing that the sync block 0G is acceptably correct. For the sync block 1H, both the predicted identification signal (the predicted value) and the detected identification signal (the detected value) are "1". In this case, the comparison result or the decision result provided by the comparison circuit 33 is "0", representing that the sync block 1H is acceptably correct.

With reference to FIG. 9, a packet (a data block "A") AB is reconstructed from the sync blocks 0A and 1B. A packet (a data block "A") CD is reconstructed from the sync blocks 0C and 1D. As previously indicated, the sync block 0X is discarded. A packet (a data block "A") EF is reconstructed from the sync blocks 0E and 1F. A packet (a data block "A") GH is reconstructed from the sync blocks 0G and 1H.

In summary, the comparison circuit 33 decides whether every pair of successive sync blocks is complete or incomplete by referring to the predicted identification signal and the detected identification signal fed from the identification signal prediction circuit 31 and the identification signal detection circuit 32. The comparison circuit 33 controls the write control circuit 34 to discard the sync blocks in the incomplete pairs. The comparison circuit 33 controls the write control circuit 34 to maintain the sync blocks in the complete pairs.

Second Embodiment

A second embodiment of this invention is designed to handle data blocks which result from the data block conversion explained with reference to FIGS. 3 and 4.

Figure 10:
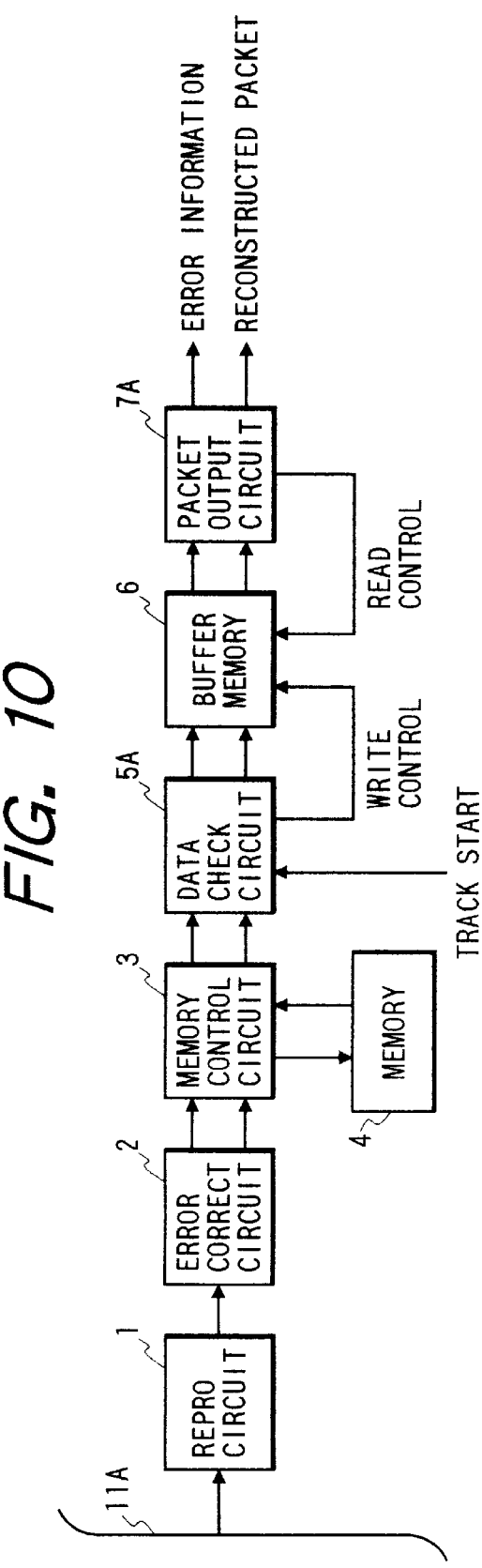
FIG. 10 is a block diagram of a digital data reproducing apparatus according to a second embodiment of this invention.

FIG. 10 shows a digital data reproducing apparatus according to the second embodiment of this invention. The digital data reproducing apparatus of FIG. 10 is similar to the digital data reproducing apparatus of FIG. 6 except for design changes explained hereinafter.

The digital data reproducing apparatus of FIG. 10 includes a magnetic tape 11A instead of the magnetic tape 11 in FIG. 6. The magnetic tape 11A stores data blocks "B" which are generated from data blocks "A" according to the data block conversion explained with reference to FIGS. 3 and 4. The data blocks "B" are sync blocks, respectively. The data blocks "A" are packets, respectively.

The digital data reproducing apparatus of FIG. 10 includes a data check circuit 5A instead of the data check circuit 5 in FIG. 6. The digital data reproducing apparatus of FIG. 10 includes a packet output circuit 7A instead of the packet output circuit 7 in FIG. 6.

The data check circuit 5A sequentially receives reproduced sync blocks and related error flags f2 from the memory control circuit 3. The data check circuit 5A receives a signal of every track start from a suitable device (not shown). Every track start corresponds to a head of data on a track on the recording medium 11A. The data check circuit 5A decides whether or not every sync block fed from the memory control circuit 3 is acceptably correct in response to the present sync block, previous sync blocks, and the track start signal. When the data check circuit 5A decides that a current sync block is acceptably correct, the data check circuit 5A controls the buffer memory 6 and thereby writes the current sync block and the related error flag f2 into the buffer memory 6. When the data check circuit 5A decides that a current sync block is not acceptably correct, the data check circuit 5A controls the buffer memory 6 and thereby inhibits the current sync block and the related error flag f2 from being written into the buffer memory 6. In this case, the current sync block and the related error flag f2 are discarded.

The packet output circuit 7A periodically reads out 1-packet-corresponding data from the sync block or the two successive sync blocks in the buffer memory 6, and outputs the readout data as a packet corresponding to a data block "A". In addition, the packet output circuit 7A reads out an error flag or flags f2 from the sync block or blocks in the buffer memory 6, and outputs the readout error flag or flags f2 as information of the reliability of the output packet. Thus, the packet output circuit 7A reconstructs data blocks "A" from data blocks "B" (reproduced sync blocks).

Figures 11, 12:
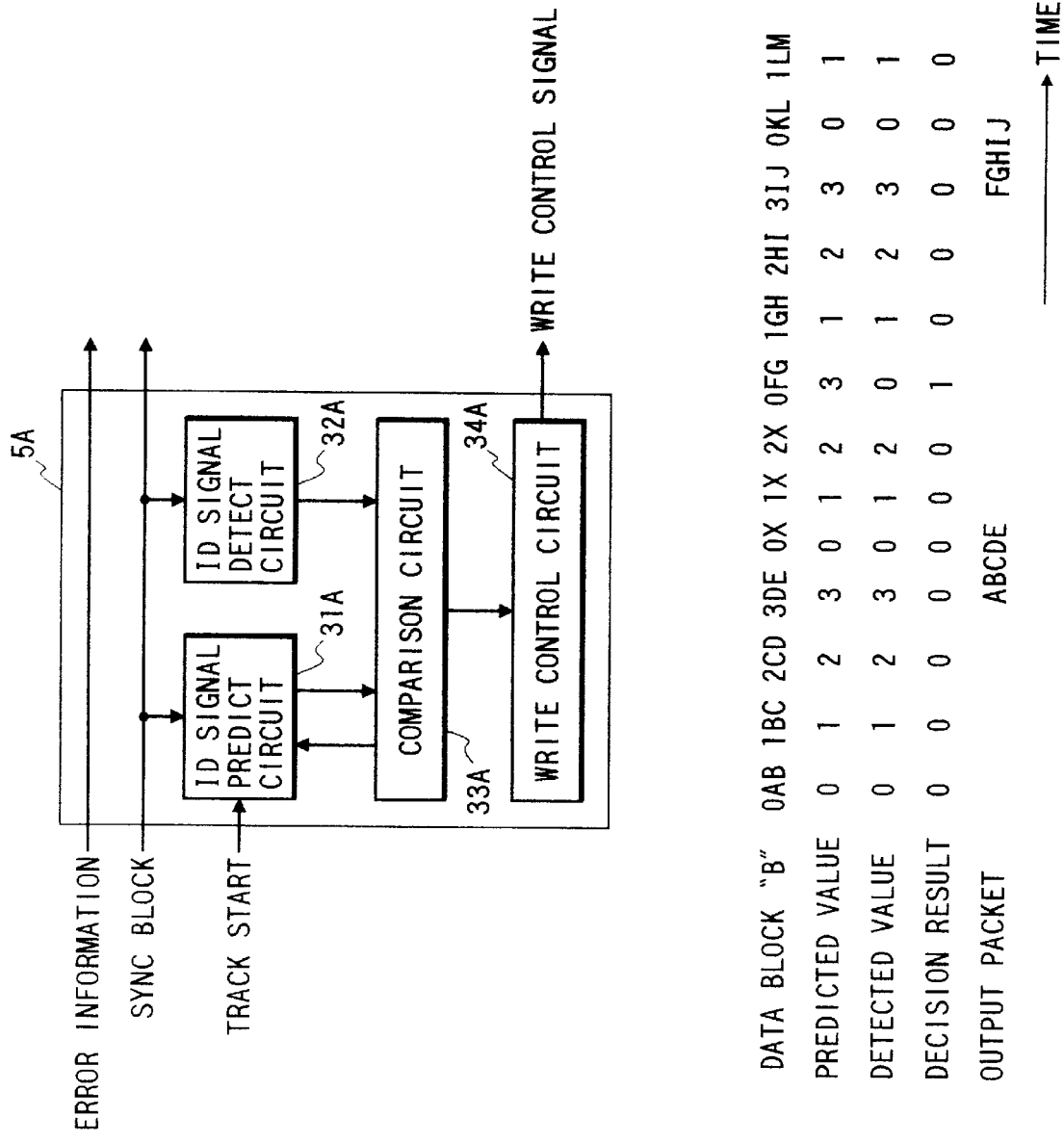
FIG. 11 is a block diagram of a data check circuit in FIG. 10.
FIG. 12 is a time-domain diagram of an example of a reproduced data block, a predicted value, a detected value, a decision result, and a final output packet which occur in the apparatus of FIG. 10.

As shown in FIG. 11, the data check circuit 5A includes an identification signal prediction circuit 31A, an identification signal detection circuit 32A, a comparison circuit 33A, and a write control circuit 34A. The identification signal prediction circuit 31A sequentially receives reproduced sync blocks from the memory control circuit 3 (see FIG. 10). The identification signal prediction circuit 31A receives the track start signal. The identification signal detection circuit 32A sequentially receives reproduced sync blocks from the memory control circuit 3 (see FIG. 10). The identification signal prediction circuit 31A and the identification signal detection circuit 32A are connected to the comparison circuit 33A. The comparison circuit 33A is connected to the write control circuit 34A. The write control circuit 34A is connected to the buffer memory 6 (see FIG. 10).

The identification signal prediction circuit 31A generates a predicted identification signal representative of an expected value of the sync block count SBC in a current sync block on the basis of the track start signal and the sync block counts SBC in previous sync blocks. The identification signal prediction circuit 31A outputs the predicted identification signal to the comparison circuit 33A.

The identification signal detection circuit 32A extracts the sync block count SBC from a current sync block. The identification signal detection circuit 32A outputs the extracted sync block count SBC to the comparison circuit 33A as a detected identification signal.

For every sync block outputted from the memory control circuit 3, the comparison circuit 33A compares the predicted identification signal and the detected identification signal to decide whether or not the sync block is acceptably correct. The comparison circuit 33A informs the write control circuit 34A. of the comparison result, that is, the result of the decision as to whether or not every sync block is acceptably correct.

The write control circuit 34A selectively permits and inhibits the writing of every sync block and a related error flag f2 into the buffer memory 6 in response to the comparison result fed from the comparison circuit 33A. The inhibition of the writing of a sync block and a related error flag f2 results in the discard thereof.

The write control circuit 34A selectively enables a present sync block and a present error flag f2 to be written over the immediately-preceding sync block and the immediately-preceding error flag f2 in the buffer memory 6 in response to the comparison result fed from the comparison circuit 33A. The over-writing discards the immediately-preceding sync block and the immediately-preceding error flag f2.

Specifically, the identification signal prediction circuit 31A includes a 2-bit counter outputting a signal which can change among "0", "1", "2", and "3". The output signal of the 2-bit counter is reset to "0" each time the track start signal is inputted thereinto. The output signal of the 2-bit counter is updated each time a sync block is inputted thereinto. Accordingly, under normal conditions, the output signal of the 2-bit counter periodically changes as "0", "1", "2", "3", "0", "1", "2", "3", "0", "1", . . . , and this change correctly corresponds to a variation (a change) among the sync block counts SBC in sync blocks outputted from the memory control circuit 3. The output signal of the 2-bit counter is fed to the comparison circuit 33A as the predicted identification signal. As will be explained later, the 2-bit counter can be adjusted by the comparison circuit 33A.

The identification signal detection circuit 32A samples every sync block at a timing which corresponds to the first main header D1 in the sync block. The identification signal detection circuit 32A decides the sampling timing by referring to a signal representing a timing at which the memory control circuit 3 reads out a sync block from the memory 4 (see FIG. 10). As a result of the sampling, the identification signal detection circuit 32A extracts the sync block count SB from every sync block. The identification signal detection circuit 32A outputs the extracted sync block count SBC to the comparison circuit 33A as the detected identification signal.

The comparison circuit 33A will be further explained. When both the predicted identification signal and the detected identification signal are "0", the comparison circuit 33A decides that the present sync block is acceptably correct. The comparison circuit 33A informs the write control circuit 34A that the present sync block is acceptably correct. In this case, the write control circuit 34A permits the present sync block and the related error flag f2 to be written into the buffer memory 6 (see FIG. 10).

When both the predicted identification signal and the detected identification signal are "1", the comparison circuit 33A decides that the present sync block is acceptably correct. The comparison circuit 33A informs the write control circuit 34A that the present sync block is acceptably correct. In this case, the write control circuit 34A permits the present sync block and the related error flag f2 to be written into the buffer memory 6 (see FIG. 10).

When both the predicted identification signal and the detected identification signal are "2", the comparison circuit 33A decides that the present sync block is acceptably correct. The comparison circuit 33A informs the write control circuit 34A that the present sync block is acceptably correct. In this case, the write control circuit 34A permits the present sync block and the related error flag f2 to be written into the buffer memory 6 (see FIG. 10).

When both the predicted identification signal and the detected identification signal are "3", the comparison circuit 33A decides that the present sync block is acceptably correct. The comparison circuit 33A informs the write control circuit 34A that the present sync block is acceptably correct. In this case, the write control circuit 34A permits the present sync block and the related error flag f2 to be written into the buffer memory 6 (see FIG. 10).

When the predicted identification signal is "0" and the detected identification signal is "1", "2", or "3", the comparison circuit 33A decides that the present sync block is not acceptably correct. The comparison circuit 33A informs the write control circuit 34A that the present sync block is not acceptably correct. In this case, the write control circuit 34A inhibits the present sync block and the related error flag f2 from being written into the buffer memory 6 (see FIG. 10). Thus, the present sync block and the related error flag f2 are discarded. In addition, the comparison circuit 33A adjusts the 2-bit counter in the identification signal prediction circuit 31A so that the output signal of the 2-bit counter will move to a normal state or a correct state.

When the predicted identification signal is "1", "2", or "3" and the detected identification signal is "0", it is considered that the present sync block is acceptably correct but the immediately-preceding sync block or the immediately-receding sync blocks having sync block counts SBC smaller than the value of the predicted identification signal are not acceptably correct. Here, the immediately-preceding sync blocks are in the buffer memory 6. In this case, the write control circuit 34A controls the buffer memory 6 in response to the comparison result fed from the comparison circuit 33A so that the immediately-preceding sync block or the immediately-receding sync blocks having sync block counts SBC smaller than the value of the predicted identification signal will be discarded, and that the related error flag f2 or the related error flags f2 will be discarded. Specifically, the write control circuit 34A moves back a write address for the buffer memory 6 by a given value, and enables the present sync block to be written over the previous sync block with the "0"-SBC in the buffer memory 6. In addition, the write control circuit 34A enables the present error flag f2 to be written over the corresponding previous error flag f2 in the buffer memory 6. On the other hand, the comparison circuit 33A adjusts the 2-bit counter in the identification signal prediction circuit 31A so that the output signal of the 2-bit counter will move to a normal state or a correct state. Specifically, the comparison circuit 33A sets the output signal of the 2-bit counter in the identification signal prediction circuit 31A to "1" for a next sync block. Then, the write control circuit 34A enables a next sync block to be written over the previous sync block with the "1"-SBC in the buffer memory 6. In addition, the write control circuit 34A enables a next error flag f2 to be written over the corresponding previous error flag f2 in the buffer memory 6.

FIG. 12 shows an example of time-domain conditions in which the predicted identification signal and the detected identification signal become "3" and "0" respectively at a certain moment. With reference to FIG. 12, there occurs a sequence of sync blocks (data blocks "B") 0AB, 1BC, 2CD, 3DE, 0X, 1X, 2X, 0FG, 1GH, 2HI, 3IJ, 0KL, and 1LM outputted from the memory control circuit 3 to the data check circuit 5A. For the sync block 0AB, both the predicted identification signal (the predicted value) and the detected identification signal (the detected value) are "0". In this case, the comparison result or the decision result provided by the comparison circuit 33A is "0", representing that the sync block 0AB is acceptably correct. For the sync block 1BC, both the predicted identification signal (the predicted value) and the detected identification signal (the detected value) are "1". In this case, the comparison result or the decision result provided by the comparison circuit 33A is "0", representing that the sync block 1BC is acceptably correct. For the sync block 2CD, both the predicted identification signal (the predicted value) and the detected identification signal (the detected value) are "2". In this case, the comparison result or the decision result provided by the comparison circuit 33A is "0", representing that the sync block 2CD is acceptably correct. For the sync block 3DE, both the predicted identification signal (the predicted value) and the detected identification signal (the detected value) are "3". In this case, the comparison result or the decision result provided by the comparison circuit 33A is "0", representing that the sync block 3DE is acceptably correct. For the sync block 0X, both the predicted identification signal (the predicted value) and the detected identification signal (the detected value) are "0". In this case, the comparison result or the decision result provided by the comparison circuit 33A is "0", representing that the sync block 0X is acceptably correct. Thus, the sync block 0X and a related error flag f2 are written into the buffer memory 6. For the sync block 1X, both the predicted identification signal (the predicted value) and the detected identification signal (the detected value) are "1". In this case, the comparison result or the decision result provided by the comparison circuit 33A is "0", representing that the sync block 1X is acceptably correct. Thus, the sync block 1X and a related error flag f2 are written into the buffer memory 6. For the sync block 2X, both the predicted identification signal (the predicted value) and the detected identification signal (the detected value) are "2". In this case, the comparison result or the decision result provided by the comparison circuit 33A is "0", representing that the sync block 2X is acceptably correct. Thus, the sync block 2X and a related error flag f2 are written into the buffer memory 6. For the sync block 0FG, the predicted identification signal (the predicted value) and the detected identification signal (the detected value) are "3" and "0" respectively. In this case, the comparison result or the decision result provided by the comparison circuit 33A is "1", representing that the immediately-preceding sync blocks 0X, 1X, and 2X are not acceptably correct. The sync block 0FG is written over the sync block 0X in the buffer memory 6 so that the sync block 0X is discarded. In addition, the error flag f2 related to the sync block 0FG is written over the error flag f2 related to the sync block 0X so that the latter error flag f2 is discarded. During a subsequent stage, the sync blocks 1X and 2X and the related error flags f2 are discarded by the over-writing process. For the sync block 1GH, both the predicted identification signal (the predicted value) and the detected identification signal (the detected value) are "1". In this case, the comparison result or the decision result provided by the comparison circuit 33A is "0", representing that the sync block 1GH is acceptably correct. For the sync block 2HI, both the predicted identification signal (the predicted value) and the detected identification signal (the detected value) are "2". In this case, the comparison result or the decision result provided by the comparison circuit 33A is "0", representing that the sync block 2HI is acceptably correct. For the sync block 3IJ, both the predicted identification signal (the predicted value) and the detected identification signal (the detected value) are "3". In this case, the comparison result or the decision result provided by the comparison circuit 33A is "0", representing that the sync block 3IJ is acceptably correct. For the sync block 0KL, both the predicted identification signal (the predicted value) and the detected identification signal (the detected value) are "0". In this case, the comparison result or the decision result provided by the comparison circuit 33A is "0", representing that the sync block 0KL is acceptably correct. For the sync block 1LM, both the predicted identification signal (the predicted value) and the detected identification signal (the detected value) are "1". In this case, the comparison result or the decision result provided by the comparison circuit 33A is "0", representing that the sync block 1LM is acceptably correct.

With reference to FIG. 12, packets (data blocks "A") A, B, C, D, and E are reconstructed from the sync blocks 0AB, 1BC, 2CD, and 3DE. As previously indicated, the sync blocks 0X, 1X, and 2X are discarded. Packets (data blocks "A") F, G, H, I, and J are reconstructed from the sync blocks 0FG, 1GH, 2HI, and 3IJC.

When the predicted identification signal is "1", "2", or "3" and the detected identification signal differs in value from the predicted identification signal, it is considered that the present sync block and the immediately-preceding sync block or the immediately-receding sync blocks having sync block counts SBC smaller than the value of the predicted identification signal are incomplete for correspondence with one data block "A". Here, the immediately-preceding sync blocks are in the buffer memory 6. In this case, the write control circuit 34A inhibits the present sync block and the related error flag f2 from being written into the buffer memory 6 (see FIG. 10). Thus, the present sync block and the related error flag f2 are discarded. In addition, the write control circuit 34A controls the buffer memory 6 in response to the comparison result fed from the comparison circuit 33A so that the immediately-preceding sync block or the immediately-receding sync blocks having sync block counts SBC smaller than the value of the predicted identification signal will be discarded, and that the related error flag f2 or the related error flags f2 will be discarded. Furthermore, the comparison circuit 33A adjusts the 2-bit counter in the identification signal prediction circuit 31A so that the output signal of the 2-bit counter will move to a normal state or a correct state.

Figure 13:
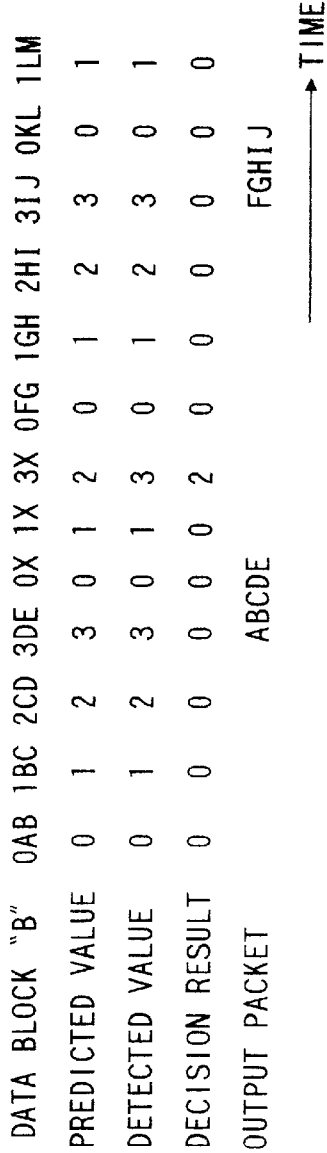
FIG. 13 is a time-domain diagram of an example of a reproduced data block, a predicted value, a detected value, a decision result, and a final output packet which occur in the apparatus of FIG. 10.

FIG. 13 shows an example of time-domain conditions in which the predicted identification signal and the detected identification signal become "2" and "3" respectively at a certain moment. With reference to FIG. 13, there occurs a sequence of sync blocks (data blocks "B") 0AB, 1BC, 2CD, 3DE, 0X, 1X, 3X, 0FG, 1GH, 2HI, 3IJ, 0KL, and 1LM outputted from the memory control circuit 3 to the data check circuit 5A. For the sync block 0AB, both the predicted identification signal (the predicted value) and the detected identification signal (the detected value) are "0". In this case, the comparison result or the decision result provided by the comparison circuit 33A is "0", representing that the sync block 0AB is acceptably correct. For the sync block 1BC, both the predicted identification signal (the predicted value) and the detected identification signal (the detected value) are "1". In this case, the comparison result or the decision result provided by the comparison circuit 33A is "0", representing that the sync block 1BC is acceptably correct. For the sync block 2CD, both the predicted identification signal (the predicted value) and the detected identification signal (the detected value) are "2". In this case, the comparison result or the decision result provided by the comparison circuit 33A is "0", representing that the sync block 2CD is acceptably correct. For the sync block 3DE, both the predicted identification signal (the predicted value) and the detected identification signal (the detected value) are "3". In this case, the comparison result or the decision result provided by the comparison circuit 33A is "0", representing that the sync block 3DE is acceptably correct. For the sync block 0X, both the predicted identification signal (the predicted value) and the detected identification signal (the detected value) are "0". In this case, the comparison result or the decision result provided by the comparison circuit 33A is "0", representing that the sync block 0X is acceptably correct. Thus, the sync block 0X and a related error flag f2 are written into the buffer memory 6. For the sync block 1X, both the predicted identification signal (the predicted value) and the detected identification signal (the detected value) are "1". In this case, the comparison result or the decision result provided by the comparison circuit 33A is "0", representing that the sync block 1X is acceptably correct. Thus, the sync block 1X and a related error flag f2 are written into the buffer memory 6. For the sync block 3X, the predicted identification signal (the predicted value) and the detected identification signal (the detected value) are "2" and "3" respectively. In this case, the comparison result or the decision result provided by the comparison circuit 33A is "2", representing that the sync blocks 0X, 1X, and 3X are incomplete for correspondence with one data bock "A". In other words, the comparison result or the decision result being "2" represents that the sync blocks 0X, 1X, and 3X are not acceptably correct. Thus, the sync blocks 0X, 1X, and 3X, and also the related error flags f2 are discarded. For the sync block 0FG, both the predicted identification signal (the predicted value) and the detected identification signal (the detected value) are "0". In this case, the comparison result or the decision result provided by the comparison circuit 33A is "0", representing that the sync block 0FG is acceptably correct. For the sync block 1GH, both the predicted identification signal (the predicted value) and the detected identification signal (the detected value) are "1". In this case, the comparison result or the decision result provided by the comparison circuit 33A is "0", representing that the sync block 1GH is acceptably correct. For the sync block 2HI, both the predicted identification signal (the predicted value) and the detected identification signal (the detected value) are "2". In this case, the comparison result or the decision result provided by the comparison circuit 33A is "0", representing that the sync block 2HI is acceptably correct. For the sync block 3IJ, both the predicted identification signal (the predicted value) and the detected identification signal (the detected value) are "3". In this case, the comparison result or the decision result provided by the comparison circuit 33A is "0", representing that the sync block 3IJ is acceptably correct. For the sync block 0KL, both the predicted identification signal (the predicted value) and the detected identification signal (the detected value) are "0". In this case, the comparison result or the decision result provided by the comparison circuit 33A is "0", representing that the sync block 0KL is acceptably correct. For the sync block 1LM, both the predicted identification signal (the predicted value) and the detected identification signal (the detected value) are "1". In this case, the comparison result or the decision result provided by the comparison circuit 33A is "0", representing that the sync block 1LM is acceptably correct.

With reference to FIG. 13, packets (data blocks "A") A, B, C, D, and E are reconstructed from the sync blocks 0AB, 1BC, 2CD, and 3DE. As previously indicated, the sync blocks 0X, 1X, and 3X are discarded. Packets (data blocks "A") F, G, H, I, and J are reconstructed from the sync blocks 0FG, 1GH, 2HI, and 3IJC.

In summary, the comparison circuit 33A decides whether every set of four successive sync blocks is complete or incomplete by referring to the predicted identification signal and the detected identification signal fed from the identification signal prediction circuit 31A and the identification signal detection circuit 32A. The comparison circuit 33A controls the write control circuit 34A to discard the sync blocks in the incomplete sets. The comparison circuit 33A controls the write control circuit 34A to maintain the sync blocks in the complete sets.

Third Embodiment

Figure 14:
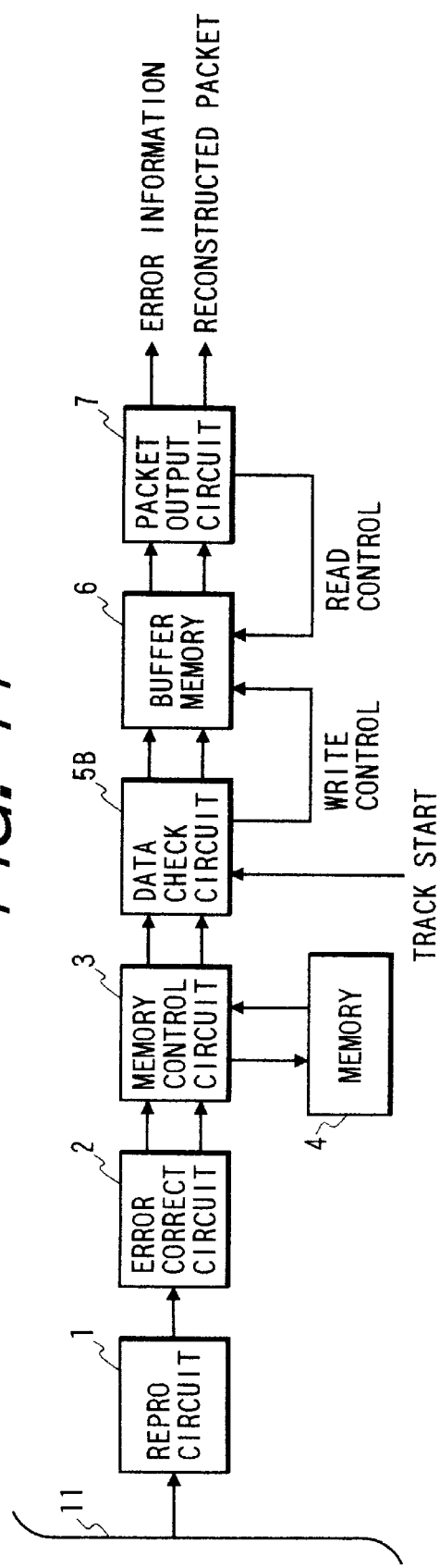
FIG. 14 is a block diagram of a digital data reproducing apparatus according to a third embodiment of this invention.

FIG. 14 shows a digital data reproducing apparatus according to a third embodiment of this invention. The digital data reproducing apparatus of FIG. 14 is similar to the digital data reproducing apparatus of FIG. 6 except for design changes explained hereinafter. The digital data reproducing apparatus of FIG. 14 includes a data check circuit 5B instead of the data check circuit 5 in FIG. 6.

The data check circuit 5B sequentially receives reproduced sync blocks and related error flags f2 from the memory control circuit 3. The data check circuit 5B receives a signal of every track start from a suitable device (not shown). Every track start corresponds to a head of data on a track on the recording medium 11. The data check circuit 5B decides whether or not every sync block fed from the memory control circuit 3 is acceptably correct in response to the present sync block, the present error flag f2, previous sync blocks, and the track start signal. When the data check circuit 5B decides that a current sync block is acceptably correct, the data check circuit 5B controls the buffer memory 6 and thereby writes the current sync block and the related error flag f2 into the buffer memory 6. When the data check circuit 5B decides that a current sync block is not acceptably correct, the data check circuit 5B controls the buffer memory 6 and thereby inhibits the current sync block and the related error flag f2 from being written into the buffer memory 6. In this case, the current sync block and the related error flag f2 are discarded.

Figure 15:
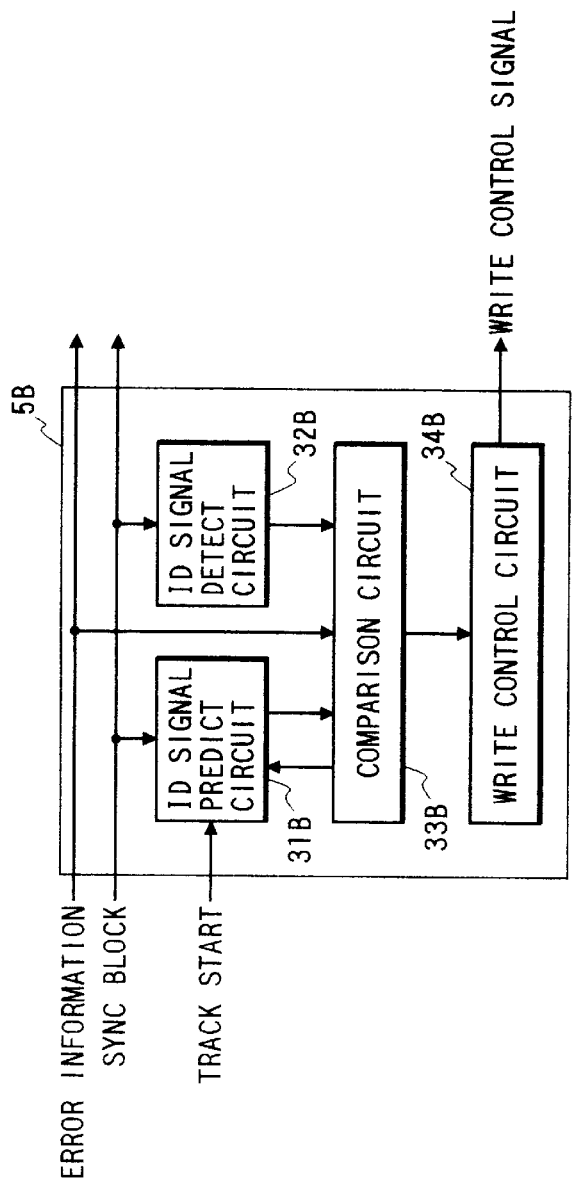
FIG. 15 is a block diagram of a data check circuit in FIG. 14.

As shown in FIG. 15, the data check circuit 5B includes an identification signal prediction circuit 31B, an identification signal detection circuit 32B, a comparison circuit 33B, and a write control circuit 34B. The identification signal prediction circuit 31B sequentially receives reproduced sync blocks from the memory control circuit 3 (see FIG. 14). The identification signal prediction circuit 31B receives the track start signal. The identification signal detection circuit 32B sequentially receives reproduced sync blocks from the memory control circuit 3 (see FIG. 14). The identification signal prediction circuit 31B and the identification signal detection circuit 32B are connected to the comparison circuit 33B. The comparison circuit 33B sequentially receives error flags f2 from the memory control circuit 3 (see FIG. 14). The comparison circuit 33B is connected to the write control circuit 34B. The write control circuit 34B is connected to the buffer memory 6 (see FIG. 14).

The identification signal prediction circuit 31B and the identification signal detection circuit 32B are similar to the identification signal prediction circuit 31 and the identification signal detection circuit 32 in FIG. 7. The identification signal prediction circuit 31B periodically outputs a predicted identification signal to the comparison circuit 33B. The identification signal detection circuit 32B periodically outputs a detected identification signal to the comparison circuit 33B.

For every sync block outputted from the memory control circuit 3, the comparison circuit 33B compares the predicted identification signal and the detected identification signal to decide whether or not the sync block is acceptably correct. The comparison circuit 33B modifies the comparison result in response to the error flag 2. The comparison circuit 33B informs the write control circuit 34B of the modified comparison result, that is, the modified result of the decision as to whether or not every sync block is acceptably correct.

The write control circuit 34B selectively permits and inhibits the writing of every sync block and a related error flag f2 into the buffer memory 6 in response to the modified comparison result fed from the comparison circuit 33B. The inhibition of the writing of a sync block and a related error flag f2 results in the discard thereof.

The write control circuit 34B selectively enables a present sync block and a present error flag f2 to be written over the immediately-preceding sync block and the immediately-preceding error flag f2 in the buffer memory 6 in response to the modified comparison result fed from the comparison circuit 33B. The over-writing discards the immediately-preceding sync block and the immediately-preceding error flag f2.

The comparison circuit 33B will be further explained. When both the predicted identification signal and the detected identification signal are "0", the comparison circuit 33B decides that the present sync block is acceptably correct regardless of the state (the value) of the related error flag f2. The comparison circuit 33B informs the write control circuit 34B that the present sync block is acceptably correct. In this case, the write control circuit 34B permits the present sync block and the related error flag f2 to be written into the buffer memory 6 (see FIG. 14).

When both the predicted identification signal and the detected identification signal are "1", the comparison circuit 33B decides that the present sync block is acceptably correct regardless the state (the value) of the related error flag f2. The comparison circuit 33B informs the write control circuit 34B that the present sync block is acceptably correct. In this case, the write control circuit 34B permits the present sync block and the related error flag f2 to be written into the buffer memory 6 (see FIG. 14).

When the predicted identification signal and the detected identification signal are "0" and "1" respectively and the present error flag f2 is "0", the comparison circuit 33B decides that the present sync block is not acceptably correct. The comparison circuit 33B informs the write control circuit 34B that the present sync block is not acceptably correct. In this case, the write control circuit 34B inhibits the present sync block and the related error flag f2 from being written into the buffer memory 6 (see FIG. 14). Thus, the present sync block and the related error flag f2 are discarded. In addition, the comparison circuit 33B adjusts the 1-bit counter in the identification signal prediction circuit 31B so that the output signal of the 1-bit counter will move to a normal state or a correct state. Specifically, the comparison circuit 33B sets the output signal of the 1-bit counter in the identification signal prediction circuit 31B to "0" for a next sync block.

When the predicted identification signal and the detected identification signal are "0" and "1" respectively and the present error flag f2 is "1", the comparison circuit 33B considers the detected identification signal to be wrong. In this case, the comparison circuit 33B assumes the detected identification signal to be "0", and implements processing similar to the processing executed when both the predicted identification signal and the detected identification signal are "0".

When the predicted identification signal and the detected identification signal are "1" and "0" respectively and the present error flag f2 is "0", it is considered that the immediately-preceding sync block is not acceptably correct and the present sync bloc is acceptably correct. Here, the immediately-preceding sync block is in the buffer memory 6. In this case, the write control circuit 34B controls the buffer memory 6 in response to the comparison result fed from the comparison circuit 33B so that the immediately-preceding sync block and the related error flag f2 will be discarded. Specifically, the write control circuit 34B moves back a write address for the buffer memory 6 by a given value, and enables the present sync block to be written over the immediately-preceding sync block in the buffer memory 6. In addition, the write control circuit 34B enables the present error flag f2 to be written over the immediately-preceding error flag f2 in the buffer memory 6. On the other hand, the comparison circuit 33B adjusts the 1-bit counter in the identification signal prediction circuit 31B so that the output signal of the 1-bit counter will move to a normal state or a correct state. Specifically, the comparison circuit 33B sets the output signal of the 1-bit counter in the identification signal prediction circuit 31B to "1" for a next sync block.

When the predicted identification signal and the detected identification signal are "1" and "0" respectively and the present error flag f2 is "1", the comparison circuit 33B considers the detected identification signal to be wrong. In this case, the comparison circuit 33B assumes the detected identification signal to be "1", and implements processing similar to the processing executed when both the predicted identification signal and the detected identification signal are "1".

Fourth Embodiment

Figure 16:
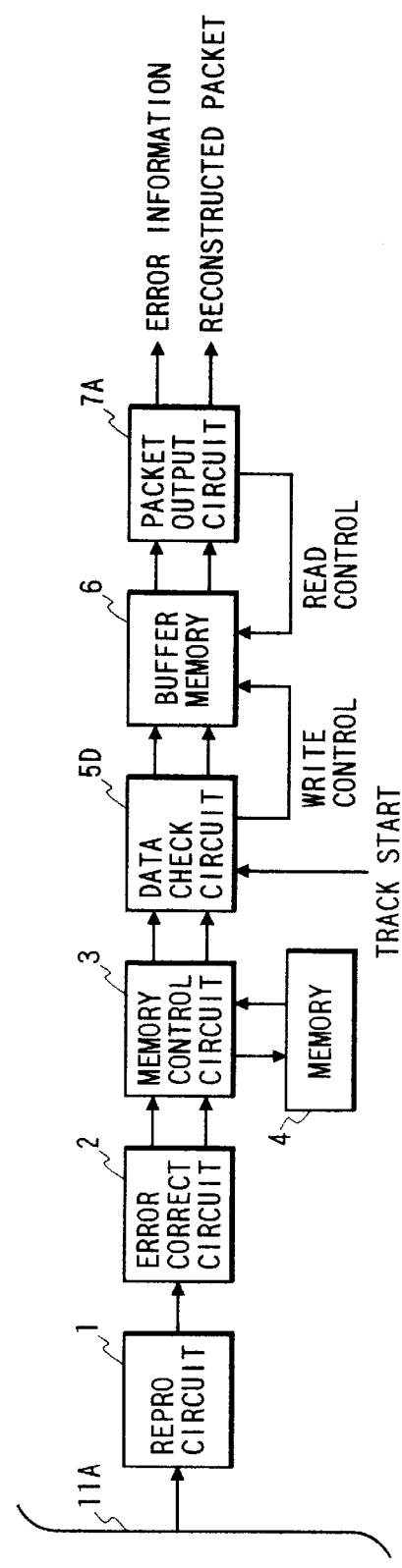
FIG. 16 is a block diagram of a digital data reproducing apparatus according to a fourth embodiment of this invention.

FIG. 16 shows a digital data reproducing apparatus according to a fourth embodiment of this invention. The digital data reproducing apparatus of FIG. 16 is similar to the digital data reproducing apparatus of FIG. 10 except for design changes explained hereinafter. The digital data reproducing apparatus of FIG. 16 includes a data check circuit 5D instead of the data check circuit 5A in FIG. 10.

The data check circuit 5D sequentially receives reproduced sync blocks and related error flags f2 from the memory control circuit 3. The data check circuit 5D receives a signal of every track start from a suitable device (not shown). Every track start corresponds to a head of data on a track on the recording medium 11A. The data check circuit 5D decides whether or not every sync block fed from the memory control circuit 3 is acceptably correct in response to the present sync block, the present error flag f2, previous sync blocks, and the track start signal. When the data check circuit 5D decides that a current sync block is acceptably correct, the data check circuit 5D controls the buffer memory 6 and thereby writes the current sync block and the related error flag f2 into the buffer memory 6. When the data check circuit 5D decides that a current sync block is not acceptably correct, the data check circuit 5D controls the buffer memory 6 and thereby inhibits the current sync block and the related error flag f2 from being written into the buffer memory 6. In this case, the current sync block and the related error flag f2 are discarded.

Figure 17:
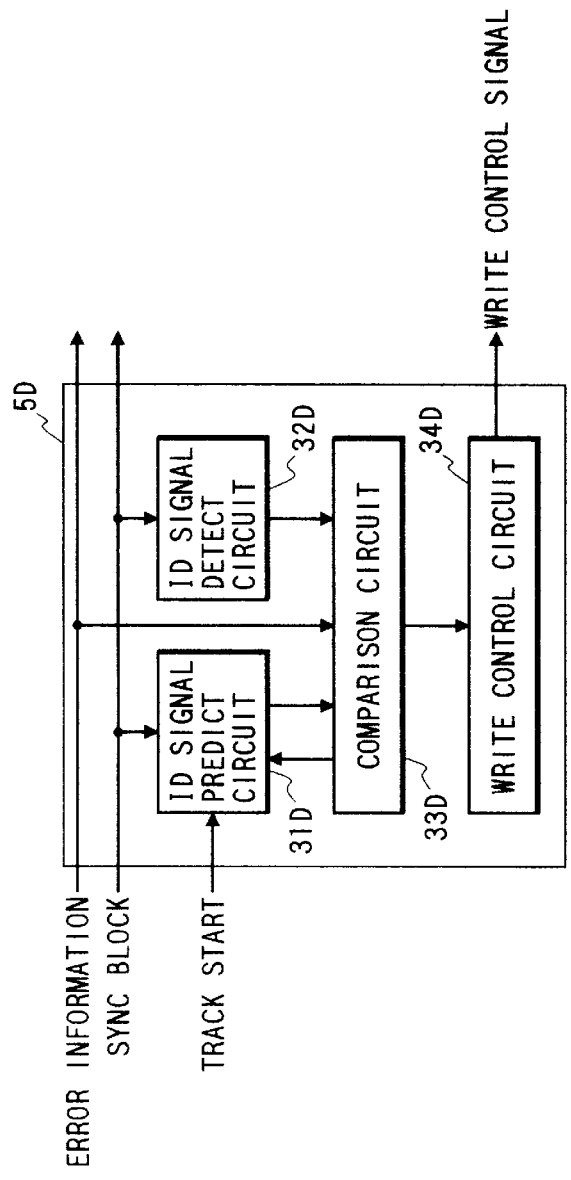
FIG. 17 is a block diagram of a data check circuit in FIG. 16.

As shown in FIG. 17, the data check circuit 5D includes an identification signal prediction circuit 31D, an identification signal detection circuit 32D, a comparison circuit 33D, and a write control circuit 34D. The identification signal prediction circuit 31D sequentially receives reproduced sync blocks from the memory control circuit 3 (see FIG. 16). The identification signal prediction circuit 31D receives the track start signal. The identification signal detection circuit 32D sequentially receives reproduced sync blocks from the memory control circuit 3 (see FIG. 16). The identification signal prediction circuit 31 D and the identification signal detection circuit 32D are connected to the comparison circuit 33D. The comparison circuit 33D sequentially receives error flags f2 from the memory control circuit 3 (see FIG. 16). The comparison circuit 33D is connected to the write control circuit 34D. The write control circuit 34D is connected to the buffer memory 6 (see FIG. 16).

The identification signal prediction circuit 31D and the identification signal detection circuit 32D are similar to the identification signal prediction circuit 31A and the identification signal detection circuit 32A in FIG. 11. The identification signal prediction circuit 31D periodically outputs a predicted identification signal to the comparison circuit 33D. The identification signal detection circuit 32D periodically outputs a detected identification signal to the comparison circuit 33D.

For every sync block outputted from the memory control circuit 3, the comparison circuit 33D compares the predicted identification signal and the detected identification signal to decide whether or not the present sync block is acceptably correct. The comparison circuit 33D modifies the comparison result in response to the error flag 2. The comparison circuit 33D informs the write control circuit 34D of the modified comparison result, that is, the modified result of the decision as to whether or not every sync block is acceptably correct.

The write control circuit 34D selectively permits and inhibits the writing of every sync block and a related error flag f2 into the buffer memory 6 in response to the modified comparison result fed from the comparison circuit 33D. The inhibition of the writing of a sync block and a related error flag f2 results in the discard thereof.

The write control circuit 34D selectively enables a present sync block and a present error flag f2 to be written over the immediately-preceding sync block and the immediately-preceding error flag f2 in the buffer memory 6 in response to the modified comparison result fed from the comparison circuit 33D. The over-writing discards the immediately-preceding sync block and the immediately-preceding error flag f2.

The comparison circuit 33D will be further explained. When both the predicted identification signal and the detected identification signal are "0", the comparison circuit 33D decides that the present sync block is acceptably correct regardless of the state (the value) of the related error flag f2. The comparison circuit 33D informs the write control circuit 34D that the present sync block is acceptably correct. In this case, the write control circuit 34D permits the present sync block and the related error flag f2 to be written into the buffer memory 6 (see FIG. 16).

When the predicted identification signal is "1", "2", or "3" and the detected identification signal is equal in value to the predicted identification signal, the comparison circuit 33D decides that the present sync block is acceptably correct regardless the state (the value) of the related error flag f2. The comparison circuit 33D informs the write control circuit 34D that the present sync block is acceptably correct. In this case, the write control circuit 34D permits the present sync block and the related error flag f2 to be written into the buffer memory 6 (see FIG. 16).

When the predicted identification signal is "0" and the detected identification signal is "1", "2", or "3" in the case where the present error flag f2 is "0", the comparison circuit 33D decides that the present sync block is not acceptably correct. The comparison circuit 33D informs the write control circuit 34D that the present sync block is not acceptably correct. In this case, the write control circuit 34D inhibits the present sync block and the related error flag f2 from being written into the buffer memory 6 (see FIG. 16). Thus, the present sync block and the related error flag f2 are discarded. In addition, the comparison circuit 33D adjusts the 2-bit counter in the identification signal prediction circuit 31D so that the output signal of the 2-bit counter will move to a normal state or a correct state. Specifically, the comparison circuit 33D sets the output signal of the 2-bit counter in the identification signal prediction circuit 31D to "0" for a next sync block.

When the predicted identification signal is "0" and the detected identification signal is "1", "2", or "3" in the case where the present error flag f2 is "1", the comparison circuit 33D considers the detected identification signal to be wrong. In this case, the comparison circuit 33D assumes the detected identification signal to be "0", and implements processing similar to the processing executed when both the predicted identification signal and the detected identification signal are "0".

When the predicted identification signal is "1", "2", or "3" and the detected identification signal is "0" in the case where the present error flag f2 is "0", it is considered that the immediately-preceding sync block is not acceptably correct and the present sync bloc is acceptably correct. Here, the immediately-preceding sync block is in the buffer memory 6. In this case, the write control circuit 34D controls the buffer memory 6 in response to the comparison result fed from the comparison circuit 33D so that the immediately-preceding sync block and the related error flag f2 will be discarded. Specifically, the write control circuit 34D moves back a write address for the buffer memory 6 by a given value, and enables the present sync block to be written over the immediately-preceding sync block in the buffer memory 6. In addition, the write control circuit 34D enables the present error flag f2 to be written over the immediately-preceding error flag f2 in the buffer memory 6. On the other hand, the comparison circuit 33D adjusts the 2-bit counter in the identification signal prediction circuit 31D so that the output signal of the 2-bit counter will move to a normal state or a correct state. Specifically, the comparison circuit 33D sets the output signal of the 2-bit counter in the identification signal prediction circuit 31D to "1" for a next sync block.

When the predicted identification signal is "1", "2", or "3" and the detected identification signal is "0" in the case where the present error flag f2 is "1", the comparison circuit 33D considers the detected identification signal to be wrong. In this case, the comparison circuit 33D assumes the detected identification signal to be equal to the predicted identification signal, and implements processing similar to the processing executed when the predicted identification signal and the detected identification signal are equal in value.

When the predicted identification signal is "1", "2", or "3" and the detected identification signal differs in value from the predicted identification signal in the case where the present error flag f2 is "0", it is considered that the present sync block and the immediately-preceding sync block or the immediately-receding sync blocks having sync block counts SBC smaller than the value of the predicted identification signal are incomplete for correspondence with one data block "A". Here, the immediately-preceding sync blocks are in the buffer memory 6. In this case, the write control circuit 34D inhibits the present sync block and the related error flag f2 from being written into the buffer memory 6. Thus, the present sync block and the related error flag f2 are discarded. In addition, the write control circuit 34D controls the buffer memory 6 in response to the comparison result fed from the comparison circuit 33D so that the immediately-preceding sync block or the immediately-receding sync blocks having sync block counts SBC smaller than the value of the predicted identification signal will be discarded, and that the related error flag f2 or the related error flags f2 will be discarded. Furthermore, the comparison circuit 33D adjusts the 2-bit counter in the identification signal prediction circuit 31D so that the output signal of the 2-bit counter will move to a normal state or a correct state.

When the predicted identification signal is "1", "2", or "3" and the detected identification signal differs in value from the predicted identification signal in the case where the present error flag f2 is "1", the comparison circuit 33D considers the detected identification signal to be wrong. In this case, the comparison circuit 33D assumes the detected identification signal to be equal to the predicted identification signal, and implements processing similar to the processing executed when the predicted identification signal and the detected identification signal are equal in value.

Fifth Embodiment

Figure 18:
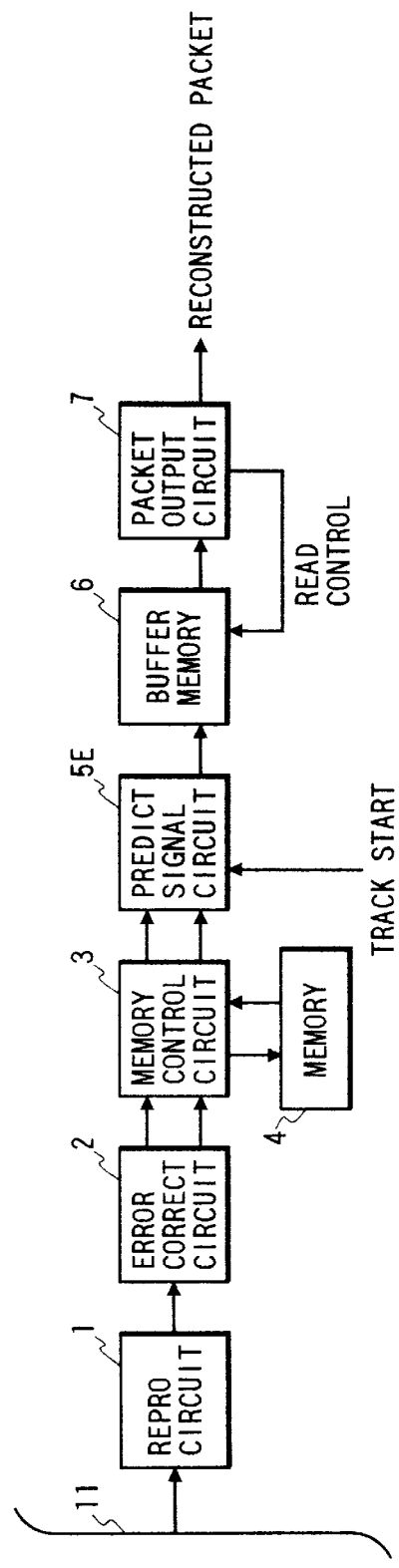
FIG. 18 is a block diagram of a digital data reproducing apparatus according to a fifth embodiment of this invention.

FIG. 18 shows a digital data reproducing apparatus according to a fifth embodiment of this invention. The digital data reproducing apparatus of FIG. 18 is similar to the digital data reproducing apparatus of FIG. 14 except for design changes explained hereinafter. The digital data reproducing apparatus of FIG. 18 includes a predicted signal circuit 5E instead of the data check circuit 5B in FIG. 14.

Figure 19:
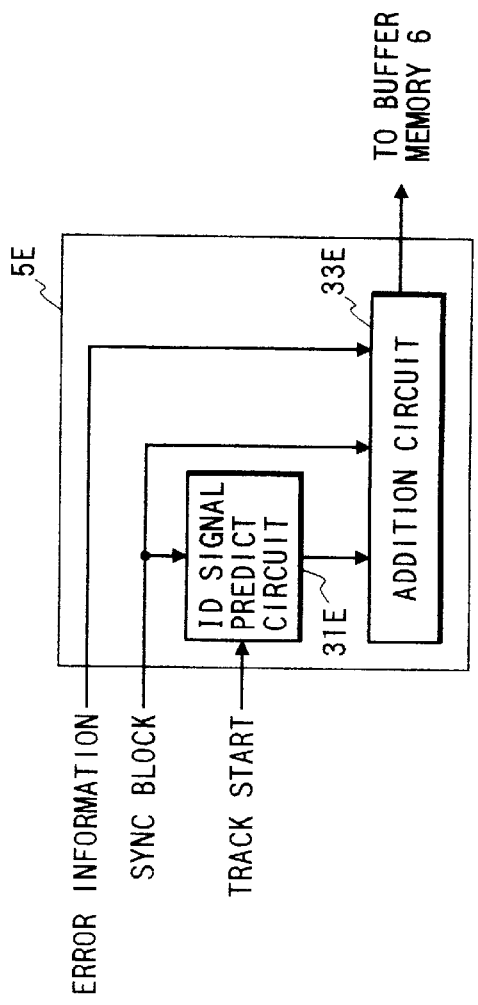
FIG. 19 is a block diagram of a predicted signal circuit in FIG. 18.

As shown in FIG. 19, the predicted signal circuit 5E includes an identification signal prediction circuit 31E and an addition circuit 33E. The identification signal prediction circuit 31E and the addition circuit 33E sequentially receive reproduced sync blocks from the memory control circuit 3 (see FIG. 18). The identification signal prediction circuit 31E receives the track start signal. The identification signal prediction circuit 31E is connected to the addition circuit 33E. The addition circuit 33E sequentially receives error flags f2 from the memory control circuit 3 (see FIG. 18). The addition circuit 33E is connected to the buffer memory 6 (see FIG. 18).

The identification signal prediction circuit 31E is similar to the identification signal prediction circuit 31B in FIG. 15. The identification signal prediction circuit 31E periodically outputs a predicted identification signal to the addition circuit 33E.

For every sync block outputted from the memory control circuit 3, the addition circuit 33E adds the predicted identification signal and the error flag f2 to the sync block, and writes the addition-resultant sync block into the buffer memory 6. Thus, the addition circuit 33E sequentially stores addition-resultant sync blocks into the buffer memory 6.

Sixth Embodiment

Figure 20:
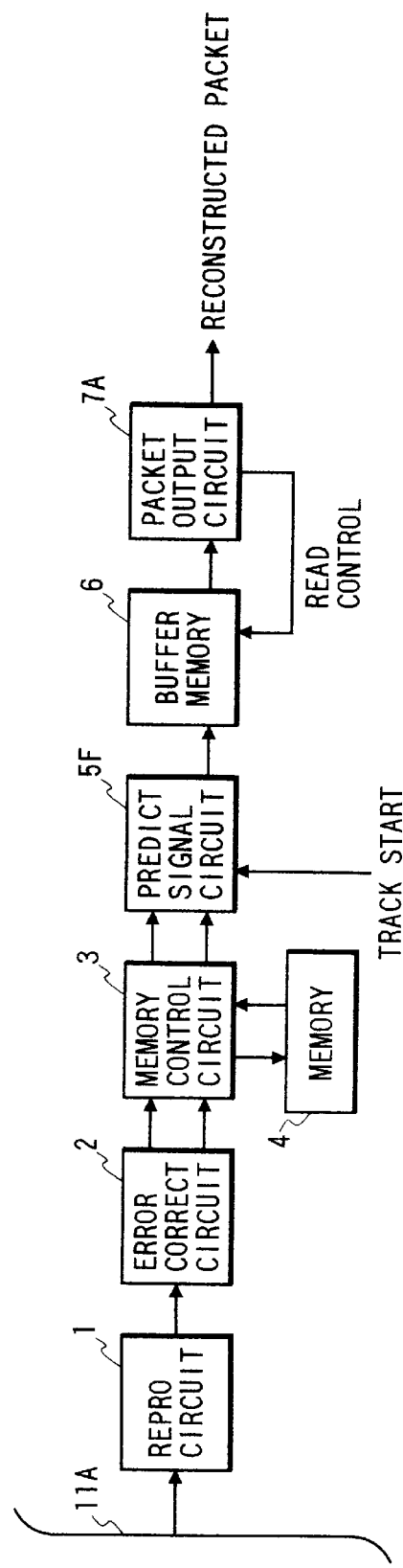
FIG. 20 is a block diagram of a digital data reproducing apparatus according to a sixth embodiment of this invention.

FIG. 20 shows a digital data reproducing apparatus according to a sixth embodiment of this invention. The digital data reproducing apparatus of FIG. 20 is similar to the digital data reproducing apparatus of FIG. 16 except for design changes explained hereinafter. The digital data reproducing apparatus of FIG. 20 includes a predicted signal circuit 5F instead of the data check circuit 5D in FIG. 16.

Figure 21:
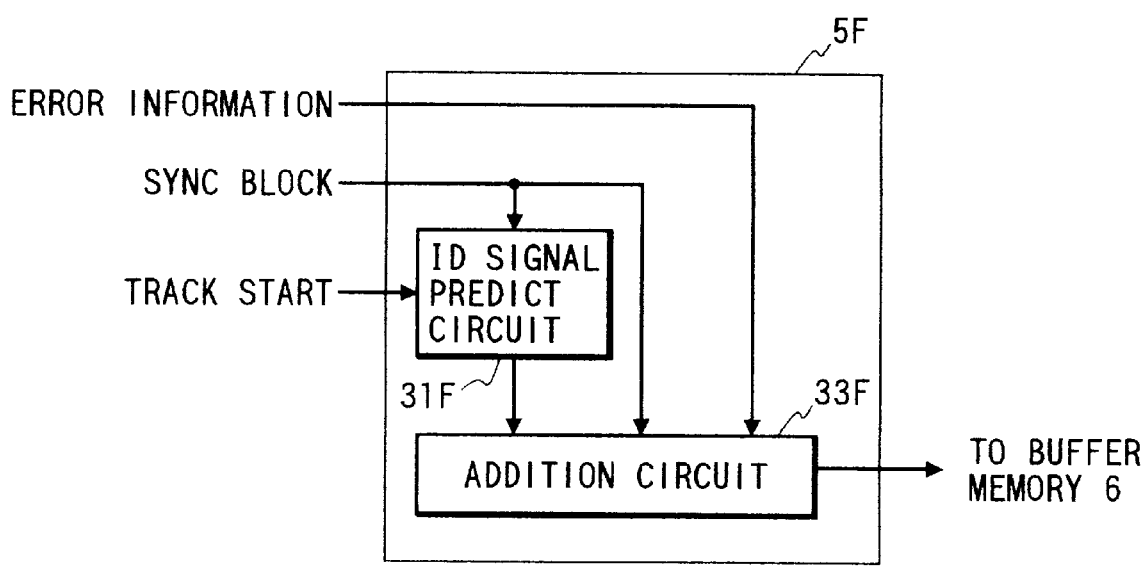
FIG. 21 is a block diagram of a predicted signal circuit in FIG. 20.

As shown in FIG. 21, the predicted signal circuit 5F includes an identification signal prediction circuit 31F and an addition circuit 33F. The identification signal prediction circuit 31F and the addition circuit 33F sequentially receive reproduced sync blocks from the memory control circuit 3 (see FIG. 20). The identification signal prediction circuit 31F receives the track start signal. The identification signal prediction circuit 31F is connected to the addition circuit 33F. The addition circuit 33F sequentially receives error flags f2 from the memory control circuit 3 (see FIG. 20). The addition circuit 33F is connected to the buffer memory 6 (see FIG. 20).

The identification signal prediction circuit 31F is similar to the identification signal prediction circuit 31D in FIG. 17. The identification signal prediction circuit 31F periodically outputs a predicted identification signal to the addition circuit 33F.

For every sync block outputted from the memory control circuit 3, the addition circuit 33F adds the predicted identification signal and the error flag f2 to the sync block, and writes the addition-resultant sync block into the buffer memory 6. Thus, the addition circuit 33F sequentially stores addition-resultant sync blocks into the buffer memory 6.

Other Embodiments

The first, second, third, fourth, fifth, and sixth embodiments of this invention may be modified to handle data blocks which result from the conversion of every data block "A" into three data blocks "B".

The first, second, third, fourth, fifth, and sixth embodiments of this invention may be modified to use a magnetic disc or a magnetooptical disc instead of the magnetic tape 11 or 11A.

What is claimed is:

1. A digital data reproducing apparatus comprising;
    first means for reproducing first data blocks from a recording medium, the first data blocks containing respective identification information pieces for discriminating the first data blocks from each other;
    second means for predicting the identification information pieces in the first data blocks reproduced by the first means, and generating predicted information pieces representing results of the predicting;
    third means for adding the predicted information pieces generated by the second means to the first data blocks reproduced by the first means to convert the first data blocks to second data blocks;
    fourth means for generating third data blocks from the second data blocks generated by the third means, the third data blocks differing in size from the first data blocks,
    fifth means for correcting errors in each of the first data blocks reproduced by the first means;
    sixth means for deciding whether or not at least one error which has not been corrected by the fifth means remains in each of the first data blocks reproduced by the first means, and generating an error flag signal representing a result of the deciding for each of the first data blocks reproduced by the first means; and
    seventh means for adding the error flag signals generated by the sixth means to the second data blocks generated by the third means.

2. A digital data reproducing apparatus comprising:
    first means for reproducing first data blocks from a recording medium, the first data blocks containing respective identification information pieces for discriminating the first data blocks from each other;
    second means for deciding whether or not each of the first data blocks reproduced by the first means is correct in response to the identification information piece therein comprising;
    means for predicting the identification information pieces in the first data blocks reproduced by the first means to generate predicted information pieces;
    means for detecting the identification information pieces in the first data blocks reproduced by the first means to generate detected information pieces; and
    means for deciding that each first data block is correct when the related predicted information piece and the related detected information piece are equal to each other;
    third means for discarding each first data block which is decided to be not correct by the second means; and
    fourth means for generating second data blocks from the first data blocks which are reproduced by the first means and which are not discarded by the third means, the second data blocks differing in size from the first data blocks.

3. A digital data reproducing apparatus as recited in claim 2, wherein the second means further comprises means for deciding that each first data block is not correct when the related predicted information piece and the related detected information piece are different from each other.

4. A digital data reproducing apparatus as recited in claim 3, wherein each of the second data blocks corresponds to a set of plural first data blocks among the first data blocks generated by the first means, and the third means comprises means for, in cases where a first data block is decided to be not correct and a detected information piece related to said first data block represents that said first data block is a head data block in a set corresponding to one second data block, discarding at least one previous first data block immediately preceding said first data block, using said first data block as a correct first data block, and adjusting a predicted information piece for a next first data block to represent that the next first data block is a data block immediately following the head data block.

5. A digital data reproducing apparatus as recited in claim 3, wherein each of the second data blocks corresponds to a set of plural first data blocks among the first data blocks generated by the first means, and the third means comprises means for, in cases where a first data block is decided to be not correct and a detected information piece related to said first data block represents that said first data block differs from a head data block in a set corresponding to one second data block, discarding said first data block and at least one immediately preceding first data block in said set, and adjusting a predicted information piece for a next first data block to represent that the next first data block is a head data block in a set.

6. A digital data reproducing apparatus as recited in claim 2, wherein the predicting means comprises a counter responding to each of the first data blocks reproduced by the first means.

7. A digital data reproducing apparatus, comprising:
    first means for reproducing first data blocks from a recording medium, the first data blocks containing respective identification information pieces for discriminating the first data blocks from each other;
    second means for deciding whether or not each of the first data blocks reproduced by the first means is correct in response to the identification information piece therein;
    third means for discarding each first data block which is decided to be not correct by the second means; and
    fourth means for generating second data blocks from the first data blocks which are reproduced by the first means and which are not discarded by the third means, the second data blocks differing in size from the first data blocks,
    fifth means for correcting errors in each of the first data blocks reproduced by the first means;
    sixth means for deciding whether or not at least one error which has not been corrected by the fifth means remains in each of the first data blocks reproduced by the first means, and generating an error flag signal representing a result of the deciding for each of the first data blocks reproduced by the first means;

seventh means provided in the second means for predicting the identification information pieces in the first data blocks reproduced by the first means to generate predicted information pieces;

eighth means provided in the second means for detecting the identification information pieces in the first data blocks reproduced by the first means to generate detected information pieces; and ninth means provided in the second means for deciding whether or not each of the first data blocks produced by the first means is correct in response to the error flag signal, the predicted information piece, and the detected information piece.

8. A digital data reproducing apparatus as recited in claim 7, wherein the second means comprises means for deciding that each first data block is correct in cases where the related error flag signal represents error absence, and where the related predicted information piece and the related detected information piece are equal to each other.

9. A digital data reproducing apparatus as recited in claim 7, wherein:

the second means comprises means for deciding that the predicted information piece is wrong in cases where the related error flag signal represents error absence, and where the related predicted information piece and the related detected information piece are different from each other; and the second means comprises means for deciding that the detected information piece is wrong in cases where the related error flag signal represents error presence, and where the related predicted information piece and the related detected information piece are different from each other.

10. A digital data reproducing apparatus as recited in claim 7, wherein:

each of the second data blocks corresponds to a set of plural first data blocks among the first data blocks generated by the first means;

the second means comprises means for deciding that the predicted information piece is wrong in cases where the related error flag signal represents error absence, and where the related predicted information piece and the related detected information piece are different from each other;

the third means comprises means for, in cases where a first data block is decided to be not correct and a detected information piece related to said first data block represents that said first data block is a head data block in a set corresponding to one second data block, discarding at least one previous first data block immediately preceding said first data block, using said first data block as a correct first data block, and adjusting a predicted information piece for a next first data block to represent that the next first data block is a data block immediately following the head data block; and the third means comprises means for, in cases where a first data block is decided to be not correct and a detected information piece related to said first data block represents that said first data block differs from a head data block in a set corresponding to one second data block, discarding said first data block and at least one immediately preceding first data block in said set, and adjusting a predicted information piece for a next first data block to represent that the next first data block is a head data block in a set.

11. A digital data reproducing apparatus as recited in claim 7, wherein:

the second means comprises means for deciding that the detected information piece is wrong in cases where the related error flag signal represents error presence, and where the related predicted information piece and the related detected information piece are different from each other; and the third means for, in cases where the detected information piece is decided to be wrong, using a first data block related to the detected information piece as a first data block corresponding to the predicted information piece.

12. A method comprising the steps of:

reproducing first data blocks from a recording medium, the first data blocks containing respective identification information pieces for discriminating the first data blocks from each other;

correcting errors in each of the reproduced first data blocks;

deciding whether or not the last one error which has not been corrected remains in each of the reproduced first data blocks, and generating an error flag signal representing a result of the deciding for each of the reproduced first data blocks;

predicting the identification information pieces in the reproduced first data blocks, and generating predicted information pieces representing results of the predicting;

adding the predicted information pieces to the reproduce first data blocks to convert the first data blocks to second data blocks;

adding the error flag signals to the second data blocks; and generating third data blocks from the second data blocks, the third data blocks differing in size from the first data blocks.

13. A method comprising the steps of:

reproducing first data blocks from a recording medium, the first data blocks containing respective identification information pieces for discriminating the first data blocks from each other;

deciding whether or not each of the reproduced first data blocks is correct in response to the identification information piece therein;

discarding each reproduced first data block which is decided to be not correct; and generating second data blocks from the reproduced first data blocks which are not discarded, the second data blocks differing in size from the first data blocks, wherein the deciding steps comprises:

predicting the identification information pieces in the reproduced first data blocks to generate predicted information pieces;

detecting the identification information pieces in the reproduced first data blocks to generate information pieces; and deciding that each first data block is correct when the related predicted information piece and the related detected information piece are equal to each other.

14. A method as recited in claim 13, wherein the predicting step comprises counting the reproduced first data blocks.

15. An apparatus comprising:
first means for sequentially reproducing sets each having a given number of first equal-size data blocks as members from a recording medium, wherein the first data blocks in each of the sets contain respective identification information pieces for discriminating the first data blocks from each other in the set;
second means for predicting an identification information piece in a present first data block reproduced by the first means in response to a previous first data block reproduced by the first means, and for generating a prediction signal representative of a result of the predicting;
third means for detecting the identification information in the present first data block reproduced by the first means, and for generating a detection signal representative of a result of the detecting;
fourth means for comparing the prediction signal generated by the second means and the detection signal generated by the third means;
fifth means for deciding whether each of the sets reproduced by the first means is complete or incomplete regarding members thereof in response to a result of the comparing by the fourth means;
sixth means for discarding the first data blocks in the sets which are decided to be incomplete by the fifth means; and
seventh means for converting each of the sets which are decided to be complete by the fifth means into at least one second data block differing in size from the first data blocks.

16. A method comprising the steps of:
sequentially reproducing sets each having a given number of first equal-size data blocks as members from a recording medium, wherein the first data blocks in each of the sets contain respective identification information pieces for discriminating the first data blocks from each other in the set;
predicting an identification information piece in a present first data block in response to a previous first data block, and generating a prediction signal representative of a result of the predicting;
detecting the identification information in the present first data block, and generating a detection signal representative of a result of the detecting;
comparing the prediction signal and the detection signal;
deciding whether each of the reproduced sets is complete or incomplete regarding members thereof in response to a result of the comparing;
discarding the first data blocks in the reproduced sets which are decided to be incomplete; and
converting each of the reproduced sets which are decided to be complete into at least one second data block differing in size from the first data blocks.

17. A digital data reproducing apparatus for a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:
first means for reproducing second data blocks containing the respective identification information pieces from the recording medium;
second means for deciding whether or not each of the second data blocks necessary for reconstruction of a first data block has been correctly reproduced by the first means in response to an identification information piece therein;
third means for, in cases where the second means decides that at least one of the second data blocks has not been correctly reproduced, discarding at least one of the second data blocks related to said first data block; and
fourth means for reconstructing the third data blocks from the second data blocks which are reproduced by the first means and which are not discarded by the third means.

18. A digital data reproducing apparatus for a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:
first means for reproducing second data blocks containing the respective identification information pieces from the recording medium;
second means for predicting the identification information pieces in the second data blocks reproduced by the first means, and generating predicted information pieces representing results of the predicting;
third means for adding the predicted information pieces generated by the second means to the second data blocks reproduced by the first means to convert the second data blocks to third data blocks; and
fourth means for reconstructing the first data blocks from the third data blocks generated by the third means.

19. A digital data reproducing apparatus for a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:
first means for sequentially reproducing sets each having a given number of second data blocks as members from the recording medium;
second means for predicting an identification information piece in a present second data block reproduced by the first means in response to a previous second data block reproduced by the first means, and for generating a prediction signal representative of a result of the predicting;
third means for detecting the identification information in the present second data block reproduced by the first means, and for generating a detection signal representative of a result of the detecting;
fourth means for comparing the prediction signal generated by the second means and the detection signal generated by the third means;
fifth means for deciding whether each of the sets reproduced by the first means is complete or incomplete regarding members thereof in response to a result of the comparing by the fourth means;

sixth means for discarding the second data blocks in the sets which are decided to be incomplete by the fifth means; and seventh means for converting each of the sets which are decided to be complete by the fifth means into at least one first data block.

20. A method of reproducing data from a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

reproducing second data blocks containing the respective identification information pieces from the recording medium;

deciding whether or not each of the second data blocks necessary for reconstruction of a first data block has been correctly reproduced in response to the identification information piece therein;

in cases where it is decided that at least one of the second data blocks has not been correctly reproduced, discarding at least one of the second data blocks related to said first data block; and reconstructing the first data blocks from the reproduced second data blocks which are not discarded.

21. A method of reproducing data from a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

reproducing second data blocks containing the respective identification information pieces from the recording medium;

predicting the identification information pieces in the reproduced second data blocks, and generating predicted information pieces representing results of predicting;

adding the predicted information pieces to the reproduced second data blocks to convert the reproduced second data blocks to third data blocks; and reconstructing the first data blocks from the third data blocks.

22. A method of reproducing data from a recording medium, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

sequentially reproducing sets each having a given number of second data blocks as members from the recording medium;

predicting an identification information piece in a present second data block in response to a previous second data block, and for generating a prediction signal representative of a result of the predicting;

detecting the identification information in the present second data block, and for generating a detection signal representative of a result of the detecting;

comparing the prediction signal and the detection signal;

deciding whether each of the reproduced sets is complete or incomplete regarding members thereof in response to a result of the comparing;

discarding the second data blocks in the sets which are decided to be incomplete; and converting each of the reproduced sets which are decided to be complete into at least one first data block.

23. A digital data receiving apparatus for transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:

first means for reproducing the second data blocks containing the respective identification information pieces from the transmitted data;

second means for deciding whether or not each of the second data blocks necessary for reconstruction of a first data block has been correctly reproduced by the first means in response to an identification information piece therein;

third means for, in cases where the second means decides that at least one of the second data blocks has not been correctly reproduced, discarding at least one of the second data blocks related to said first data block; and fourth means for reconstructing the first data blocks from the second data blocks which are reproduced by the first means and which are not discarded by the third means.

24. A digital data receiving apparatus for transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:

first means for reproducing the second data blocks containing the respective identification information pieces from the transmitted data;

second means for predicting the identification information pieces in the second data blocks reproduced by the first means, and for generating predicted information pieces representing results of the predicting;

third means for adding the predicted information pieces generated by the second means to the second data blocks reproduced by the first means to convert the second data blocks to third data blocks; and fourth means for reconstructing the first data blocks from the third data blocks generated by the third means.

25. A digital data receiving apparatus for transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the apparatus comprising:

first means for sequentially reproducing sets each having a given number of the second data blocks as members from the transmitted data;

second means for predicting an identification information piece in a present first data block reproduced by the first means in response to a previous second data block reproduced by the first means, and for generating a prediction signal representative of a result of the predicting;

third means for detecting the identification information in the present second data block reproduced by the first means, and for generating a detection signal representative of a result of the detecting;

fourth means for comparing the prediction signal generated by the second means and the detection signal generated by the third means;

fifth means for deciding whether each of the sets reproduced by the first means is complete or incomplete regarding members thereof in response to a result of the comparing by the fourth means;

sixth means for discarding the second data blocks in the sets which are decided to be incomplete by the fifth means; and seventh means for converting each of the sets which are decided to be complete by the fifth means into at least one first data block.

26. A method of receiving transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

reproducing the second data blocks containing the respective identification information pieces from the transmitted data;

deciding whether or not each of second data blocks necessary for reconstruction of a first data block has been correctly reproduced in response to an identification information therein;

in cases where it is decided that at least one of the second data blocks has not been correctly reproduced, discarding at least one of the second data blocks related to said first data block; and reconstructing the first data blocks from the reproduced second data blocks which are not discarded.

27. A method of receiving transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

reproducing the second data blocks containing the respective identification information pieces from the transmitted data;

predicting the identification information pieces in the reproduced second data blocks, and generating predicted information pieces representing results of the predicting;

adding the predicted information pieces to the reproduced second data blocks to convert the reproduced second data blocks to third data blocks; and reconstructing the first data blocks from the third data blocks.

28. A method of receiving transmitted data, wherein "n" first data blocks are converted into "m" second data blocks, "n" denoting an integer equal to or greater than 1, "m" denoting an integer different from the integer "n" and equal to or greater than 2, the first data blocks having a first data size, the second data blocks having a second data size different from the first data size, the second data blocks containing respective identification information pieces for discriminating the second data blocks from each other, the recording medium storing the second data blocks, the method comprising the steps of:

sequentially reproducing sets each having a given number of the second data blocks as members from the transmitted data;

predicting an identification information piece in a present second data block in response to a previous second data block, and for generating a prediction signal representative of a result of the predicting;

detecting the identification information in the present second data block, and for generating a detection signal representative of a result of the detecting;

comparing the prediction signal and the detection signal;

deciding whether each of the reproduced sets is complete or incomplete regarding members thereof in response to a result of the comparing;

discarding the second data blocks in the sets which are decided to be incomplete; and converting each of the reproduced sets which are decided to be complete into at least one first data block.

* * * * *